United States Patent
Zhang et al.

(10) Patent No.: US 12,339,940 B2
(45) Date of Patent: Jun. 24, 2025

(54) CROSS-DEVICE INTERACTION METHOD AND TERMINAL DEVICE

(71) Applicant: HUAWEI TECHNOLOGIES CO., LTD., Guangdong (CN)

(72) Inventors: Yanan Zhang, Shenzhen (CN); Xuan Zhou, Shenzhen (CN); Jiayu Long, Shenzhen (CN); Yuzhuo Peng, Shenzhen (CN); Dongliang Li, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 179 days.

(21) Appl. No.: 17/916,500

(22) PCT Filed: Mar. 18, 2021

(86) PCT No.: PCT/CN2021/081568
§ 371 (c)(1),
(2) Date: Sep. 30, 2022

(87) PCT Pub. No.: WO2021/197084
PCT Pub. Date: Oct. 7, 2021

(65) Prior Publication Data
US 2023/0185889 A1 Jun. 15, 2023

(30) Foreign Application Priority Data
Mar. 31, 2020 (CN) .......................... 202010244564.5

(51) Int. Cl.
*G06F 21/31* (2013.01)
*G06F 21/44* (2013.01)
(Continued)

(52) U.S. Cl.
CPC .............. *G06F 21/31* (2013.01); *G06F 21/44* (2013.01); *G06F 21/32* (2013.01); *H04L 51/04* (2013.01);
(Continued)

(58) Field of Classification Search
CPC .......... G06F 21/31; G06F 21/44; G06F 21/32; H04L 51/04; H04L 67/535; H04L 67/146; H04W 4/70; H04W 76/14
See application file for complete search history.

(56) References Cited

U.S. PATENT DOCUMENTS 9,571,536 B2 * 2/2017 Jain ........................ G06Q 10/06
10,063,895 B2 * 8/2018 Makovetzky ...... H04N 21/2385
(Continued)

FOREIGN PATENT DOCUMENTS

| CN | 105791081 A | 7/2016 |
|---|---|---|
| CN | 106385470 A | 2/2017 |

(Continued)

OTHER PUBLICATIONS

"Cross-Device Taxonomy: Survey, Opportunities and Challenges of Interactions Spanning Across Multiple Devices"—Brudy et al, CHI Conference 2019, ACM Digital Library, May 2, 2019 https://dl.acm.org/doi/proceedings/10.1145/3290605 (Year: 2019).*
(Continued)

*Primary Examiner* — Randy A Scott
(74) *Attorney, Agent, or Firm* — Fish & Richardson P.C.

(57) ABSTRACT

The present disclosure relates to cross-device interaction methods and terminal devices. In one example method, a first device determines that a user identity of the first device is the same as a user identity of a second device. The first device obtains a target user of a task being executed by the second device. The first device determines, based on the target user of the task being executed by the second device,
(Continued)

that a target contact of an application currently used by the first device is the target user. The first device sends information to the target user.

12 Claims, 16 Drawing Sheets

(51) Int. Cl.
<table>
<tr><td>G06F 21/32</td><td>(2013.01)</td></tr>
<tr><td>H04L 51/04</td><td>(2022.01)</td></tr>
<tr><td>H04L 67/146</td><td>(2022.01)</td></tr>
<tr><td>H04L 67/50</td><td>(2022.01)</td></tr>
<tr><td>H04W 4/70</td><td>(2018.01)</td></tr>
<tr><td>H04W 76/14</td><td>(2018.01)</td></tr>
</table>

(52) U.S. Cl.
CPC .......... *H04L 67/146* (2013.01); *H04L 67/535* (2022.05); *H04W 4/70* (2018.02); *H04W 76/14* (2018.02)

(56) References Cited

U.S. PATENT DOCUMENTS

| | | | | |
|---|---|---|---|---|
| 2014/0359735 | A1* | 12/2014 | Lehmann | H04L 63/0884 709/227 |
| 2015/0074195 | A1* | 3/2015 | Mani | H04W 52/0209 709/204 |
| 2016/0065626 | A1* | 3/2016 | Jain | H04L 65/403 709/205 |
| 2018/0336011 | A1 | 11/2018 | Kim et al. | |
| 2021/0050009 | A1* | 2/2021 | Lo | G06F 40/30 |

FOREIGN PATENT DOCUMENTS

| | | |
|---|---|---|
| CN | 106911666 A | 6/2017 |
| CN | 106921777 A | 7/2017 |
| CN | 107613091 A | 1/2018 |
| CN | 109379431 A | 2/2019 |
| CN | 110537165 A | 12/2019 |
| CN | 111523095 A | 8/2020 |
| WO | 2017190233 A1 | 11/2017 |

OTHER PUBLICATIONS

"2019 Trends: Cross Device Attribution and Multi-Touch Attribution Marketing"—InMobi, Dec. 26, 2018 https://advertising.inmobi.com/blog/2019-trends-cross-device-attribution-and-multi-touch-attribution-marketing (Year: 2018).*
Ethan, "How to setup and pair your SmartWatch 3 to your Android phone?," Jul. 4, 2015, Retrieved on Jun. 27, 2023, Retrieved from URL: <https://web.archive.org/web/20180401081318/http://webcazine.com/15703/how-to-setup-and-pair-your-smartwatch-3-to-your-android-phone/>, 7 pages.
Prado, "Make/receive calls from your PC with your phone app, now available to all," Jan. 30, 2020, Retrieved on Jun. 27, 2023, Retrieved from URL: <https://web.archive.org/web/20200130053155/https://www.androidauthority.com/windows-android-call-syncing-1039039/>, 9 pages.
Extended European Search Report in European Appln No. 21778822.3, dated Jul. 5, 2023, 10 pages.
International Search Report and Written Opinion in International Appln. No. PCT/CN2021/081568, mailed on Jun. 23, 2021, 17 pages (with English translation).

* cited by examiner

Recommend the contact Laura in the call when an email is opened and a recipient is entered on the PC

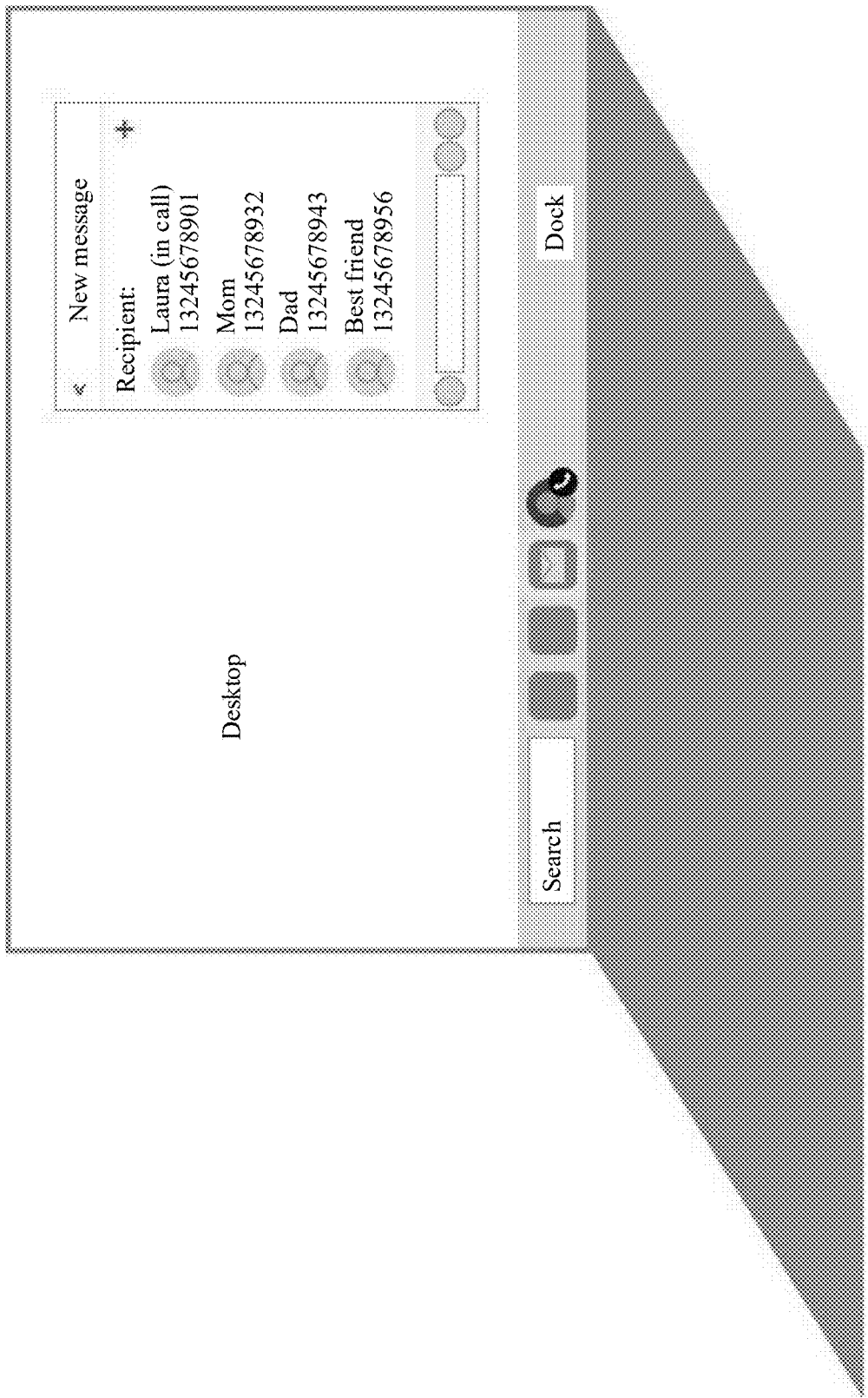
FIG. 4b  Recommend to send a message to the contact Laura in the call when "Messages" is opened on the PC

CROSS-DEVICE INTERACTION METHOD AND TERMINAL DEVICE

CROSS REFERENCE TO RELATED APPLICATIONS

This application is a national stage of International Application No. PCT/CN2021/081568, filed on Mar. 18, 2021, which claims priority to Chinese Patent Application No. 202010244564.5, filed on Mar. 31, 2020. The disclosures of the aforementioned applications are hereby incorporated by reference in their entireties.

TECHNICAL FIELD

This application relates to the terminal field, and more specifically, to a cross-device interaction method and a terminal device.

BACKGROUND

With development of network electronic technologies, each person has an increasing quantity of electronic devices, and a scenario in which a user simultaneously uses a plurality of electronic devices is increasingly common. For example, when communicating with a contact by using a mobile phone, the user may further communicate with the contact by using a computer or another electronic device. When communicating with the contact by using a computer or another electronic device, the user needs to search the computer or the another electronic device for the contact again. This is very inconvenient. Accordingly, users have an increasingly high requirement for convenience of cross-device interaction.

Therefore, how to improve convenience of cross-device interaction for a user is an urgent problem to be resolved.

SUMMARY

This application provides a cross-device interaction method and a terminal device. The method improves convenience of cross-device interaction for a user.

According to a first aspect, a cross-device interaction method is provided. A first device determines that a user identity of the first device is the same as a user identity of the second device; the first device obtains related information of a task being executed by the second device, where the related information of the task being executed by the second device includes a target user of the task being executed by the second device; the first device determines, based on the target user of the task being executed by the second device, that a target contact of an application currently used by the first device is the target user; and the first device sends information to the target user.

Therefore, the first device obtains the target user of the task being executed by the second device, and when the first device needs to contact the target user, the first device may directly send information to the target user, so that a user using the first device does not need to search for the target user on the first device, and convenience of cross-device interaction for a user is improved.

With reference to the first aspect, in some implementations of the first aspect, that the first device obtains a task being executed by the second device includes: the first device sends first information to the second device, where the first information is used to indicate the second device to send the related information of the task being executed by the second device to the first device; and after receiving the first information, the second device sends the related information of the task being executed by the second device to the first device.

With reference to the first aspect, in some implementations of the first aspect, that the first device obtains a task being executed by the second device includes: the first device sends second information to the second device, where the second information is used to notify the second device that the user identity of the first device is the same as the user identity of the second device; and after receiving the second information, the second device sends the related information of the task being executed by the second device to the first device.

With reference to the first aspect, in some implementations of the first aspect, that the first device determines, based on the target user of the task being executed by the second device, that a target contact of an application currently used by the first device is the target user includes: determining, based on a matching relationship between a contact of the application currently used by the first device and a contact of an application to which the task being executed by the second device belongs, a target user that is of the application currently used by the first device and that corresponds to the target user of the task being executed by the second device.

With reference to the first aspect, in some implementations of the first aspect, the method further includes: the first device establishes a matching relationship between an application contact of the first device and an application contact of the second device; and/or the second device establishes a matching relationship between an application contact of the first device and an application contact of the second device.

When the first device end obtains a contact in communication with the second device, the first device may invoke available communication software of a matched contact on the second device. In this manner, each device does not need to perform contact matching independently, so that a calculation amount of the device is reduced.

With reference to the first aspect, in some implementations of the first aspect, the first device is associated with the second device by using a same identity document ID or an associated ID of a same identity.

With reference to the first aspect, in some implementations of the first aspect, that the first device determines that the user identity of the first device is the same as the user identity of the second device includes: determining, based on any one or more of passwords and accounts on the first device and the second device that are logged in to by a user, facial recognition of a camera, fingerprint recognition, and voiceprint recognition, that the user identity of the first device is the same as the user identity of the second device.

A first device determines whether the user identity of the first device is the same as the user identity of the second device. When the user identity of the first device is the same as the user identity of the second device, data of the first device and data of the second device can be shared; or when the user identity of the first device is different from the user identity of the second device, data of the first device and data of the second device cannot be shared, so that security of user information is ensured.

With reference to the first aspect, in some implementations of the first aspect, the application of the task being executed by the second device is the same as the application currently used by the first device.

According to a second aspect, a cross-device interaction method is provided. The method includes: a second device receives first information sent by a first device, where the first information is used to indicate the second device to send related information of a task being executed by the second device to the first device; and the second device sends the related information of the task being executed by the second device to the first device.

With reference to the second aspect, in some implementations of the second aspect, the method further includes: the second device receives second information sent by the first device, where the second information is used to notify the second device that a user identity of the first device is the same as a user identity of the second device; and the second device sends the related information of the task being executed by the second device to the first device.

With reference to the second aspect, in some implementations of the second aspect, the method further includes: the second device establishes a matching relationship between an application contact of the first device and an application contact of the second device; and the second device sends the matching relationship to the first device.

According to a third aspect, a single-device cross-application interaction method is provided. A first device obtains related information of a task being executed by a first application, where the related information of the task being executed by the first application includes a target user of a task being executed by the first device; the first device determines, based on the target user of the task being executed by the first application, that an alternate target contact of the second application is the target user; and the first device sends information to the target user by using the second application.

With reference to the third aspect, in some implementations of the third aspect, that the first device determines, based on the target user of the task being executed by the first application, that a target contact of the second application is the target user includes:

The first device determines, based on a matching relationship between a contact of the first application and a contact of the second application, that the target contact of the second application is the target user.

With reference to the third aspect, in some implementations of the third aspect, the method further includes: the first device establishes the matching relationship between a contact of the first application and a contact of the second application.

According to a fourth aspect, a cross-device interaction system is provided. The system includes: a second device is executing a task, where an object of the task is a target user; a first device determines that a user identity of the first device is the same as a user identity of the second device; the first device obtains related information of the task being executed by the second device, where the related information includes the target user of the task being executed by the second device; the first device determines, based on the target user, that a target contact of an application currently used by the first device is the target user; and the first device sends information to the target user by using the currently used application.

With reference to the fourth aspect, in some implementations of the fourth aspect, that the first device obtains the related information of the task being executed by the second device includes: the first device sends first information to the second device, where the first information is used to indicate the second device to send the related information of the task being executed by the second device to the first device; and after receiving the first information, the second device sends the related information of the task being executed by the second device to the first device.

With reference to the fourth aspect, in some implementations of the fourth aspect, that the first device obtains the related information of the task being executed by the second device includes: the first device sends second information to the second device, where the second information is used to notify the second device that the user identity of the first device is the same as the user identity of the second device; and after receiving the second information, the second device sends the related information of the task being executed by the second device to the first device.

With reference to the fourth aspect, in some implementations of the fourth aspect, that the first device updates, based on the target user of the task being executed by the second device, an alternate target contact of an application currently used by the first device to the target user includes: updating, based on a matching relationship between a contact of the application currently used by the first device and a contact of an application to which the task being executed by the second device belongs, the alternate target contact of the application currently used by the first device to the target user.

With reference to the fourth aspect, in some implementations of the fourth aspect, the first device establishes a matching relationship between an application contact of the first device and an application contact of the second device; and/or the second device establishes a matching relationship between an application contact of the first device and an application contact of the second device.

With reference to the fourth aspect, in some implementations of the fourth aspect, that the first device determines that the user identity of the first device is the same as the user identity of the second device includes: determining, based on any one or more of passwords and accounts on the first device and the second device that are logged in to, facial recognition of a camera, fingerprint recognition, and voiceprint recognition, that the user identity of the first device is the same as the user identity of the second device.

According to a fifth aspect, a device is provided. The device is a first device, and includes: a processing unit, configured to determine that a user identity of the first device is the same as a user identity of the second device; and a transceiver unit, configured to obtain related information of a task being executed by the second device, where the related information of the task being executed by the second device includes a target user of the task being executed by the second device. The processing unit is further configured to: determine, based on the target user of the task being executed by the second device, that a target contact of an application currently used by the first device is the target user; and the transceiver unit is further configured to send information to the target user.

With reference to the fifth aspect, in some implementations of the fifth aspect, the transceiver unit is specifically configured to: the first device sends first information to the second device, where the first information is used to indicate the second device to send the related information of the task being executed by the second device to the first device.

With reference to the fifth aspect, in some implementations of the fifth aspect, the transceiver unit is specifically configured to: the first device sends second information to the second device, where the second information is used to notify the second device that the user identity of the first device is the same as the user identity of the second device.

With reference to the fifth aspect, in some implementations of the fifth aspect, the processing unit is specifically configured to: determine, based on a matching relationship between a contact of the application currently used by the first device and a contact of an application to which the task being executed by the second device belongs, a target user that is of the application currently used by the first device and that corresponds to the target user of the task being executed by the second device.

With reference to the fifth aspect, in some implementations of the fifth aspect, the processing unit is further configured to establish the matching relationship between the contact of the application currently used by the first device and the contact of the application to which the task being executed by the second device belongs.

With reference to the fifth aspect, in some implementations of the fifth aspect, the first device is associated with the second device by using a same identity document ID or an associated ID of a same identity.

With reference to the fifth aspect, in some implementations of the fifth aspect, the processing unit is specifically configured to: determine, based on any one or more of passwords and accounts on the first device and the second device that are logged in to by a user, facial recognition of a camera, fingerprint recognition, and voiceprint recognition, that the user identity of the first device is the same as the user identity of the second device.

With reference to the fifth aspect, in some implementations of the fifth aspect, the application of the task being executed by the second device is the same as the application currently used by the first device.

According to a sixth aspect, a cross-device interaction device is provided. The device is a second device, and includes: a transceiver unit, configured to receive first information sent by a first device, where the first information is used to indicate the second device to send related information of a task being executed by the second device to the first device. The transceiver unit is further configured to send the related information of the task being executed by the second device to the first device.

With reference to the sixth aspect, in some implementations of the sixth aspect, the transceiver unit is further configured to receive second information sent by the first device, where the second information is used to notify the second device that a user identity of the first device is the same as a user identity of the second device. The transceiver unit is further configured to send the related information of the task being executed by the second device to the first device.

With reference to the sixth aspect, in some implementations of the sixth aspect, the device further includes a processing unit, where the processing unit is configured to establish a matching relationship between an application contact of the first device and an application contact of the second device. The transceiver unit sends the matching relationship to the first device.

According to a seventh aspect, a terminal device is provided. The terminal device includes: a processing unit, configured to obtain related information of a task being executed by a first application, where the related information of the task being executed by the first application includes a target user of a task being executed by the first device, where the processing unit is further configured to determine, based on the target user of the task being executed by the first application, that a target contact of the second application is the target user; and a sending unit, configured to send information to the target user by using the second application.

With reference to the seventh aspect, in some implementation of the seventh aspect, the processing unit is specifically configured to: determine, based on a matching relationship between a contact of the first application and a contact of the second application, that the target contact of the second application is the target user.

With reference to the seventh aspect, in some implementations of the seventh aspect, the processing unit is further configured to establish the matching relationship between a contact of the first application and a contact of the second application.

According to an eighth aspect, a terminal device is provided, where the apparatus includes at least one processor and a memory, the memory is configured to store instructions, and the processor is configured to execute the instructions stored in the memory. When the processor executes the instructions stored in the memory, the at least one processor is configured to perform the method in the first aspect or any possible implementation of the first aspect, or configured to perform the method in the second aspect or any possible implementation of the second aspect, or configured to perform the method in the third aspect or any possible implementation of the third aspect.

According to a ninth aspect, a terminal device is provided, where the apparatus includes at least one processor and an interface circuit. The at least one processor is configured to perform the method in the first aspect or any possible implementation of the first aspect, or configured to perform the method in the second aspect or any possible implementation of the second aspect, or configured to perform the method in the third aspect or any possible implementation of the third aspect.

According to a tenth aspect, a computer program product is provided, where the computer program product includes instructions. When the instructions are run on a computer, the computer is enabled to perform the method in the first aspect or any possible implementation of the first aspect, or perform the method in the second aspect or any possible implementation of the second aspect, or perform the method in the third aspect or any possible implementation of the third aspect.

According to an eleventh aspect, a computer-readable storage medium is provided, where the computer-readable storage medium stores a computer program. When the computer program is executed, the computer program is used to perform the method in the first aspect or any possible implementation of the first aspect, or perform the method in the second aspect or any possible implementation of the second aspect, or perform the method in the third aspect or any possible implementation of the third aspect.

According to a twelfth aspect, a chip is provided, including a processor and a communication interface, where the processor is configured to invoke instructions from the communication interface and run the instructions. When the processor executes the instructions, the method in the first aspect or any possible implementation of the first aspect is implemented; or the method in the second aspect or any possible implementation of the second aspect is implemented; or the method in the third aspect or any possible implementation of the third aspect is performed.

Optionally, the chip may further include a memory. The memory stores instructions, and the processor is configured to execute the instructions stored in the memory or instructions from another source. When the instructions are executed, the processor is used to implement the method in the first aspect or any possible implementation of the first aspect, or the method in the second aspect or any possible implementation of the second aspect, or perform the method in the third aspect or any possible implementation of the third aspect.

BRIEF DESCRIPTION OF DRAWINGS

FIG. 4b is a diagram of a scenario of cross-device interaction;

DESCRIPTION OF EMBODIMENTS

Figures 1, 2:
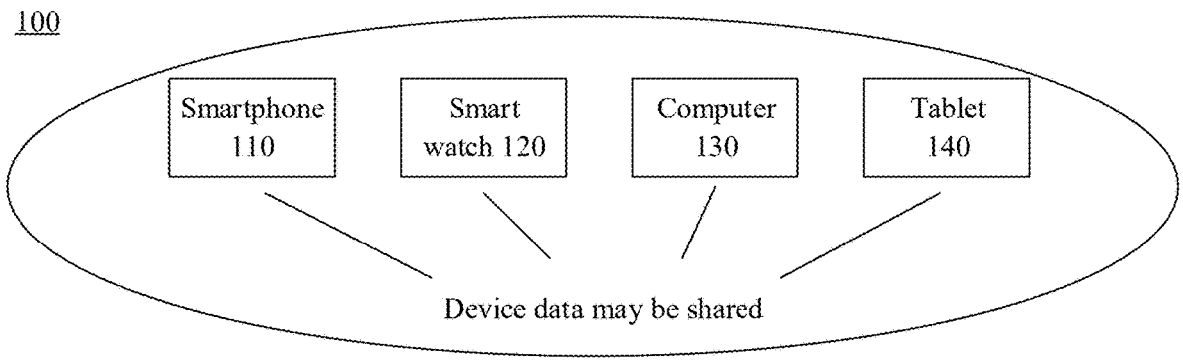
FIG. 1 is a schematic diagram of an application scenario according to this application.
FIG. 2 is a schematic flowchart of an associated device status-based cross-device interaction method according to this application.

The following describes technical solutions of this application with reference to accompanying drawings.

The technical solutions in embodiments of this application may be applied to various communication systems, for example, a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a 5th generation (5th generation, 5G) system or a new radio (new radio, NR) system, a subsequent evolved communication system, or the like.

A terminal device in embodiments of this application may alternatively be referred to as: user equipment (user equipment, UE), a mobile station (mobile station, MS), a mobile terminal (mobile terminal, MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a device that provides voice/data connectivity for a user, for example, a hand-held device or a vehicle-mounted device that has a wireless connection function. Currently, some terminals are, for example, a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a hand-held device or a computing device that has a wireless communication function, or another processing device connected to a wireless modem, a vehicle-mounted device, a wearable device, a terminal device in a 5G network, a terminal device in a future evolved public land mobile network (public land mobile network, PLMN), or the like. This is not limited in embodiments of this application.

By way of example, rather than limitation, in embodiments of this application, the wearable device may also be referred to as a wearable smart device, and is a generic term for wearable devices developed by intelligently designing daily wear by using a wearable technology, such as glasses, gloves, watches, clothes, and shoes. The wearable device is a portable device that can be directly worn by a user or integrated into clothes or an accessory of a user. The wearable device is not only a hardware device, but also implements a powerful function through software support, data exchange, and cloud interaction. In a broad sense, the wearable smart device has full functions and a large size, and can implement all or partial functions without depending on a smartphone, for example, a smart watch, smart glasses, or the like. In addition, the wearable smart device focuses only on one type of application function, and needs to be used together with another device such as a smartphone, for example, various smart bands or smart jewelries that perform sign monitoring.

In addition, in embodiments of this application, the terminal device may alternatively be a terminal device in an internet of things (internet of things, IoT) system. The IoT is an important part of future information technology development, and a main technical feature of the IoT is that an object is connected to a network by using a communication technology, to implement an intelligent network for human-machine interconnection and thing-thing interconnection.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (on-board unit, OBU).

FIG. 1 is a schematic diagram of an application scenario 100 according to this application. In FIG. 1, a smartphone 110, a smart watch 120, a computer 130, and a tablet 140 are included. The smartphone 110, the smart watch 120, the computer 130, and the tablet 140 are already associated. An association manner may be that a user logs in by using a same account, or a user logs in by using different accounts. However, these different accounts are associated accounts. For example, the different accounts correspond to same identity confirmation information, or the different accounts are bound to each other. Alternatively, an association manner may be that different unassociated accounts are in a same wireless local area network, or in a same Bluetooth network, or are directly connected by using Wi-Fi.

It should be understood that the system shown in FIG. 1 may further include more nodes, for example, another terminal device. The terminal devices included in the system shown in FIG. 1 may be the terminal devices in the foregoing various forms. Details are not shown one by one in the figure in this embodiment of this application.

In the current technology, each person has an increasing quantity of electronic devices, and a scenario in which a user simultaneously uses a plurality of electronic devices is increasingly common. When communicating with a contact by using a mobile phone, the user may further communicate with the contact by using a computer or another electronic device. When communicating with the contact by using a computer or another electronic device, the user needs to search the computer or the another electronic device for the contact again. This is very inconvenient. Accordingly, users have an increasingly high requirement for convenience of cross-device interaction.

The following describes in detail, with reference to FIG. 2, an associated device status-based cross-device interaction method provided in this application. FIG. 2 is a schematic flowchart of an associated device status-based cross-device interaction method 200 according to an embodiment of this application. The method 200 may be applied to the scenario shown in FIG. 1. Certainly, the method may also be applied to another communication scenario. This is not limited in this embodiment of this application.

It should be further understood that in this embodiment of this application, the method is described by using an example in which the method is performed by a terminal device. By way of example, rather than limitation, the method may alternatively be performed by a chip, a chip system, a processor, or the like used in the terminal device.

As shown in FIG. 2, the method 200 shown in FIG. 2 may include S210 to S240. The following describes in detail each step in the method 200 with reference to FIG. 2.

S210: A first device determines that a user identity of the first device is the same as a user identity of a second device.

S220: The first device obtains related information of a task being executed by the second device, where the related information of the task being executed by the second device includes a target user of the task being executed by the second device.

S230: The first device updates, based on the target user of the task being executed by the second device, a target contact of an application currently used by the first device to the target user.

S240: The first device sends information to the target user.

In S210, if the first device determines that the user identity of the first device is the same as the user identity of the second device, data of the first device and data of the second device can be shared, and the first device can obtain the related information of the task being executed by the second device. If the first device determines that the user identity of the first device is different from the user identity of the second device, data of the first device and data of the second device cannot be shared, and the first device is not allowed to obtain the related information of the task being executed by the second device.

Data sharing between two devices means that data sharing between two devices within a specific distance can be implemented by using a Wi-Fi/Bluetooth or local area network technology. When the user identity of the first device is the same as the user identity of the second device, a task being executed by the first terminal device, a contact list of a mobile phone end, and an ID of a user being in contact with the mobile phone end may be sent to the associated second device within a specific distance. The task being executed by the first terminal device may be making a call, sending an SMS message, or chatting through third-party software, such as QQ or WeChat.

The first device determines whether the user identity of the first device is the same as the user identity of the second device. When the user identity of the first device is the same as the user identity of the second device, data of the first device and data of the second device can be shared; or when the user identity of the first device is different from the user identity of the second device, data of the first device and data of the second device cannot be shared, so that security of user information is ensured.

In an implementation, that the first device obtains a task being executed by the second device includes: the first device sends first information to the second device, where the first information is used to indicate the second device to send the related information of the task being executed by the second device to the first device; and after receiving the first information, the second device sends the related information of the task being executed by the second device to the first device.

Specifically, in this implementation, the first device is a primary device, and the second device is a secondary device. After the first device determines that the user identity of the first device is the same as the user identity of the second device, the first device sends the first information to the second device, where the first information is used to indicate the second device to send the related information of the task being executed by the second device to the first device. After receiving the first information, the second device sends the related information of the task being executed by the second device to the first device.

In an implementation, that the first device obtains a task being executed by the second device includes: the first device sends second information to the second device, where the second information is used to notify the second device that the user identity of the first device is the same as the user identity of the second device; and after receiving the second information, the second device sends the related information of the task being executed by the second device to the first device.

Specifically, in this implementation, the second device is an active party, and the first device is a passive party. After the first device determines that the user identity of the first device is the same as the user identity of the second device, the first device sends the second information to the second device, where the second information is used to notify the second device that the user identity of the first device is the same as the user identity of the second device. After receiving the second information, the second device sends the related information of the task being executed by the second device to the first device.

In an implementation, that the first device obtains a task being executed by the second device includes: the first device sends second information to the second device, where the second information is used to notify the second device that the user identity of the first device is the same as the user identity of the second device; after receiving the second information, the second device does not immediately send the related information of the task being executed by the second device to the first device; and after further receiving the first information sent by the first device, the second device sends the related information of the task being executed by the second device to the first device.

In an implementation, that the first device determines, based on the target user of the task being executed by the second device, that a target contact of an application currently used by the first device is the target user includes: determining, based on a matching relationship between a contact of the application currently used by the first device and a contact of an application to which the task being executed by the second device belongs, a target user that is of the application currently used by the first device and that corresponds to the target user of the task being executed by the second device.

Figure 3A:
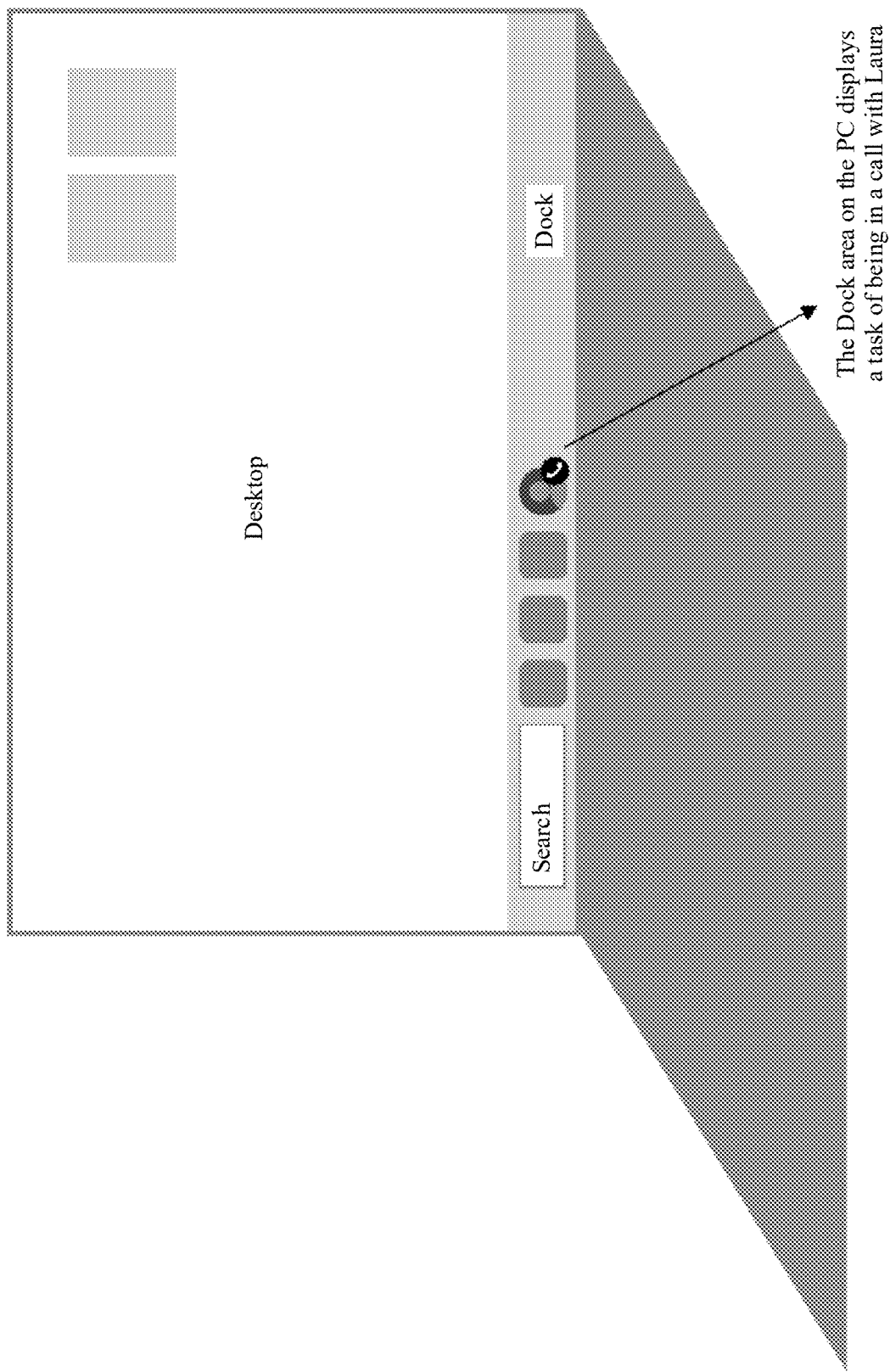
FIG. 3a is a diagram of a scenario of cross-device interaction.
Figure 3B:
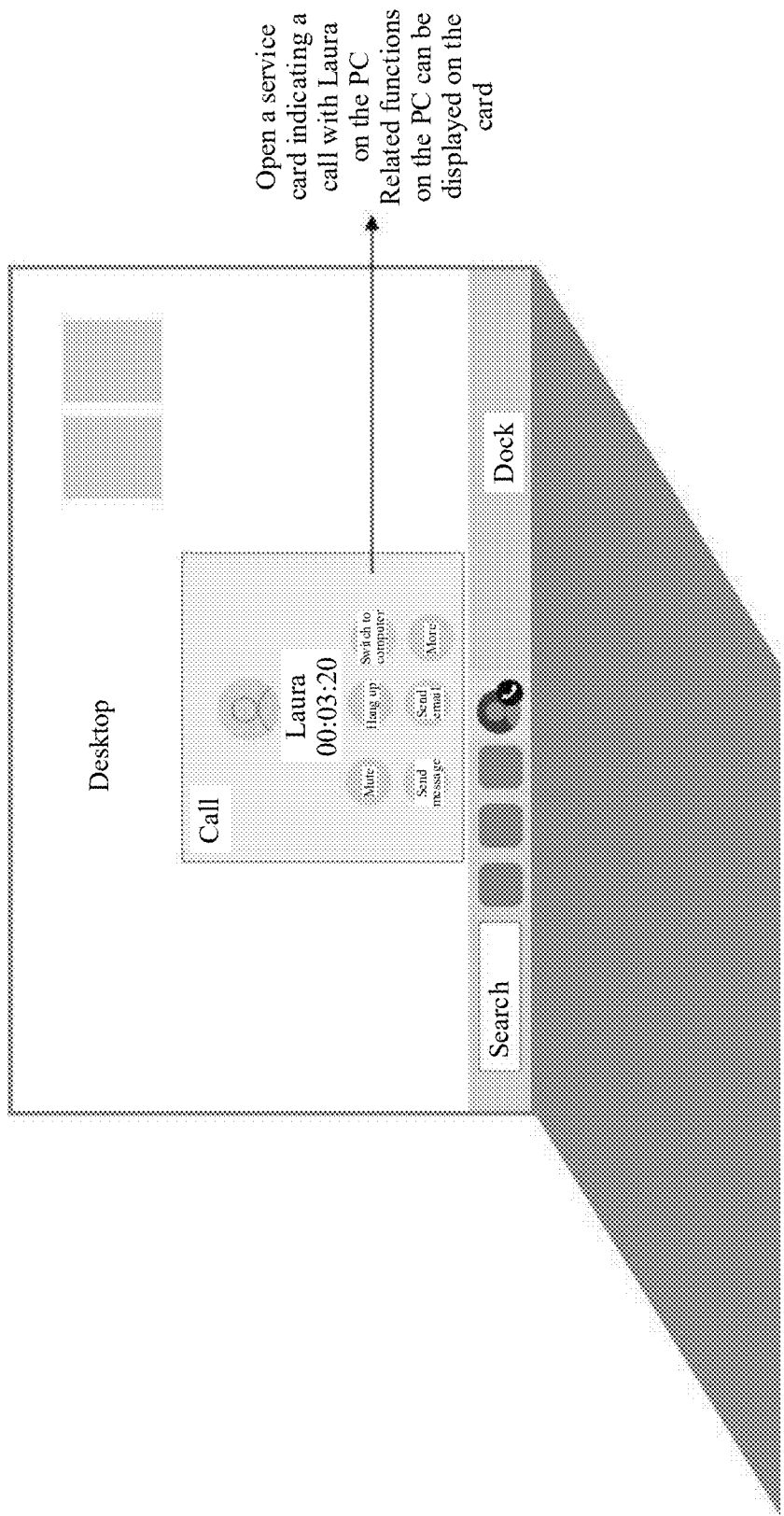
FIG. 3b is a diagram of a scenario of cross-device interaction.
Figure 3C:
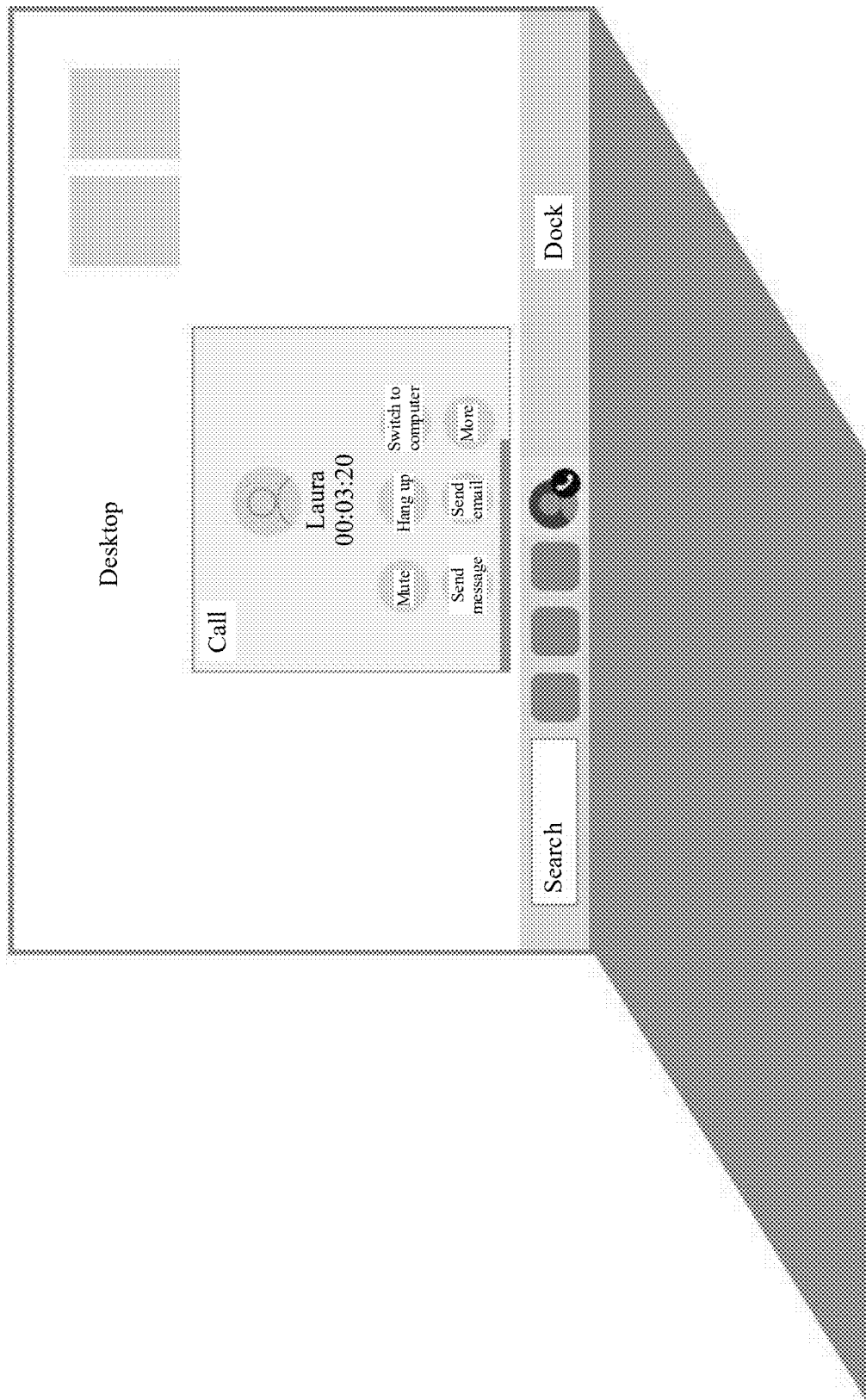
FIG. 3c is a diagram of a scenario of cross-device interaction.

For example, FIG. 3 is a diagram of a scenario of associated device status-based cross-device interaction. FIG. 3 includes FIG. 3a, FIG. 3b, and FIG. 3c. Ann calls Laura on a mobile phone, and Ann's mobile phone and computer use a same login account. Ann's mobile phone is the foregoing second device, Ann's computer is the foregoing first device, and the computer shown in FIG. 3 is Ann's computer. A task being executed on Ann's mobile phone is making a call to Laura. Ann uses the computer at the same time, and Ann's computer can learn that Ann's mobile phone is executing "the task of being in a call with Laura". Therefore, a profile picture (replaced with L in the figure) of the contact Laura in the call is displayed on a task bar of the computer, as shown in FIG. 3a. The profile picture corresponds to a service card. On Ann's computer, the profile picture of the contact Laura is clicked, to open the corresponding service card. The service card displays "the task of being in a call" and atomic ability operations such as "Send message", "Send email", "Hang up", "Mute", and "Switch to computer" that are related to the task, as shown in FIG. 3b. A user can click "Send message", to invoke an IM dialog capability of the mobile phone, display an IM dialog page with Laura on the computer, and send a message to Laura. Functions of the service card corresponding to the profile picture may further include sending a file to the contact that is in the call. Ann may drag a file that needs to be shared to Laura into the service card, to quickly share the file to Laura, as shown in FIG. 3c. Ann can also click the email button on the service card, to quickly send an email to Laura on the computer. Ann can also drag a file into the service card or Laura's profile picture area, to quickly share the file on the computer to Laura who is in the call.

It should be understood that, the atomic ability may further enable the user to contact, on the first device, a target contact by using a first application. When using the second device at the same time, the user may start the first application on the second device. The first application is not installed on the second device. An implementation principle thereof may be as follows: The second device sends, to the first device, an instruction for switching the first application to execute a command on the second device; when receiving the instruction for switching the first application to execute a command on the second device, the first device sends data of the first application to the second device; and when the second device receives the data of the first application, the target contact may be contacted on the second device by using the first application. Ann initiates a WeChat video call to Laura on the mobile phone. The mobile phone is a first device, and the computer is a second device. Ann uses the computer at the same time, and WeChat is not installed on the computer. However, the atomic ability provides an atomic ability operation, that is, "Switch to computer for execution". Ann clicks the "Switch to computer for execution" command on the computer, and the computer sends the command to the mobile phone. When receiving the command, the mobile phone sends WeChat data to the computer. The data may be current cached data of the WeChat video call that is initiated to Laura, or may be all cached data of WeChat, including historical chat data. When receiving the data of WeChat, the computer may start WeChat video chat with Laura.

In an implementation, the user contacts the target contact on the first device by using the first application. When using the second device at the same time, the user may start the first application on the second device. The first application is not installed on the second device. An implementation principle thereof may be as follows: An application invoking structure is installed on the second device, and the application invoking structure may be used to start different applications. For example, Ann initiates a WeChat video call to Laura on the mobile phone. The mobile phone is a first device, and the computer is a second device. Ann uses the computer at the same time, and WeChat is not installed on the computer. However, an application invoking structure is installed on the computer. When Ann clicks the "application invoking structure" command on the computer, WeChat data sent by Ann and Laura on the mobile phone may be obtained.

It should be further understood that applications on Ann's mobile phone and computer may have different versions. For example, WeChat of an Android version is installed on Ann's mobile phone, and WeChat of a Windows version is installed on Ann's computer. However, Ann's mobile phone and computer have a same system. For example, both the mobile phone and the computer have Huawei HarmonyOS. In this scenario, Ann chats with Laura through WeChat on the mobile phone. When Ann puts down the mobile phone and uses the computer, Laura's WeChat profile picture is displayed on the task bar of Ann's computer, and the profile picture corresponds to a service card. On Ann's computer, Laura's WeChat profile picture is clicked, to open the corresponding service card. The card displays "an ongoing WeChat task" and atomic ability operations such as "Send message" and "Send email" that are related to the task. Ann can chat with Laura through WeChat on the computer, or communicate with Laura in another manner.

It should be understood that the foregoing profile picture that is of the contact Laura who is in the call and that is displayed on the task bar of the computer corresponds to a service card. The service card displays "the task of being in a call" and atomic ability operations such as "Send message" and "Send email" that are related to the task. The atomic ability is defined by the NSFOCUS atomic service workgroup. An atomic service (ability) (Atomic ability, AA) is a program entity that can be independently executed to implement a single function. A bearer entity type of the AA may be a small program/quick application/Native service. An AA is a minimum unit for providing an ability or a service for an external system. Services in applications are divided more thoroughly by using an AA. Therefore, an AA has the following features: An AA can be started in a minimum set to reduce resource consumption whenever possible; AAs between different applications are streamlined through a system to better meet scenario requirements of a user; and a distribution platform provides various entries to provide more diversified and intelligent services. An AA is a basic service unit of an application. These service units are individuals that are logically orthogonal to each other. These service units are combined in a diversified manner to construct complete services of an application and can be loaded based on a service requirement of the application. These service units can be used inside the application, or may be used by another application. In this way, basic service units of an application can be reused to a maximum extent. A system is a set of applications, and further may be a set of services or abilities. The system may derive, through a combination of AAs, more extensive services, to meet various requirements of a user. Logically, the AAs have their own descriptions. The AAs can be invoked as services or combined into a more complex service. In addition, a corresponding runtime framework is used to manage a corresponding life cycle, permission, and the like.

A task bar of a computer generally includes four parts: a start menu, a quick start toolbar, an application button distribution area, and a notification area. An icon of an application that is already opened on the computer is displayed on the task bar. In other words, a task/program being executed on the computer is displayed on the task bar. When applied to a cross-device interaction scenario, a task that is being executed by a same user on another device may be displayed on the task bar of the computer.

In this specification, only a Windows system is used as an example for description. The technical solutions of this application may be further applied to an iOS system. In the iOS system, a Dock area of a computer, that is, Dock bar (dock bar), corresponds to the task bar of the Windows system. The Dock is a functional interface that is in a graphical user interface and that is used to start and switch a running application. The Dock is an important part of Apple's Mac OS X operating system and ancestors thereof NeXTSTEP and OPENSTEP operating systems. There are also some early examples of a dock concept in Newton OS. There are many different dock programs in different operating systems. According to a definition of the Dock area in the industry, a task/program being executed are displayed in the Dock area.

Figure 4A:
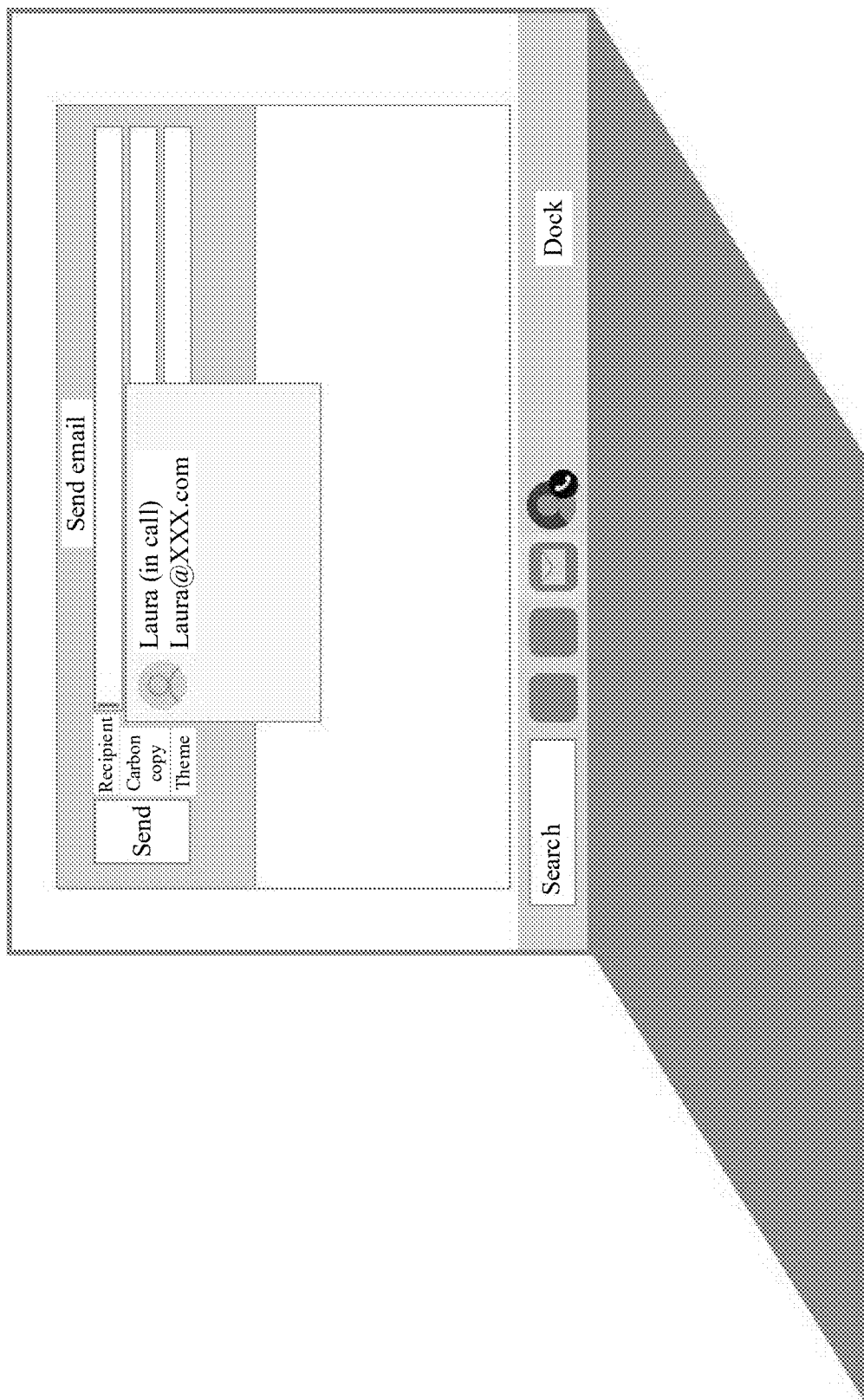
FIG. 4a is a diagram of a scenario of cross-device interaction.
Figure 4C:
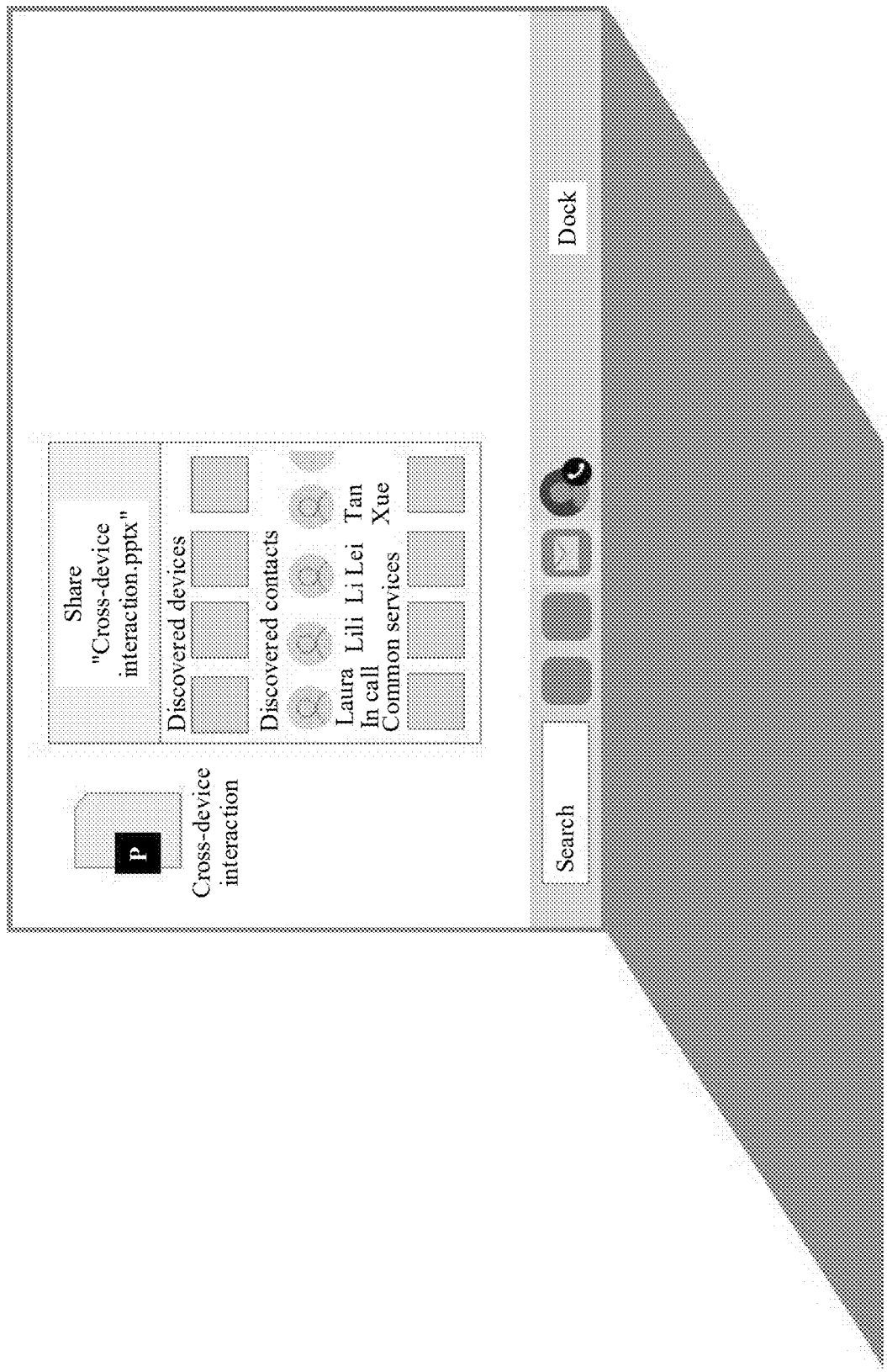
FIG. 4c is a diagram of a scenario of cross-device interaction.

FIG. 3 mainly describes the method for performing cross-device interaction on a computer by using a service card corresponding to a target contact image. In the solutions of this application, cross-device interaction may be further implemented by using an application loaded on a computer. FIG. 4 is a diagram of a scenario of cross-device interaction. FIG. 4 includes FIG. 4a, FIG. 4b, and FIG. 4c. In FIG. 4, Ann's mobile phone and computer use a same login account. Ann's mobile phone is the foregoing second device, Ann's computer is the foregoing first device, and the computer shown in FIG. 4 is Ann's computer. When Ann makes a call to Laura on the mobile phone and uses the computer at the same time, Ann's computer can learn that Ann's mobile phone is executing "a task of being in a call with Laura", and a profile picture (replaced with L in the figure) of the contact Laura in the call is displayed on a task bar of the computer. Ann sends an email to Laura by using the computer. When Ann opens a mailbox on the computer, creates an email, and clicks a recipient, the computer recommends Laura who is in the call as a contact, as shown in FIG. 4a. Ann sends a message to Laura by using the computer. When Ann opens "Messages" on the computer, a recommended recipient in a newly created message is Laura who is in the call, as shown in FIG. 4b. Ann sends a file to Laura by using the computer. When Ann opens the file on the computer for sharing, the computer recommends sharing the file to Laura who is in the call, as shown in FIG. 4c.

Therefore, the first device obtains the target user of the task being executed by the second device, and when the first device needs to contact the target user, the first device may directly send information to the target user, so that a user using the first device does not need to search for the target user on the first device, and convenience of cross-device interaction for the user is improved.

In an implementation, the first device switches to execute the task being executed by the second device. The first device sends switchover information to the second device, where the switchover information is used to notify the second device that the first device is to execute the task being executed. After receiving the switchover information, the second device no longer executes the task being executed.

For example, Ann makes a call to Laura on the mobile phone. Ann's mobile phone and computer use a same account ID for login. The computer may learn that Ann's mobile phone is executing "a task of being in a call with Laura". If Ann clicks "Switch to computer" on the computer, the computer sends the instruction to the mobile phone end, and the mobile phone end executes the instruction to pause the call. At the same time, the computer end invokes address book information of the mobile phone, and switches audio input and output of the call and picture input and output of the call from the mobile phone to the computer end.

In an implementation, the first device ends the task being executed. The first device sends task end information to the second device. After receiving the task end information, the second device ends the task being executed.

For example, Ann makes a call to Laura on the mobile phone. Ann's mobile phone and computer use a same account ID for login. The computer may learn that Ann's mobile phone is executing "a task of being in a call with Laura". If Ann clicks "Hang up" on the computer, the computer sends the instruction of hanging up the call to the mobile phone end, and the mobile phone end executes the instruction of hanging up the call.

In an implementation, the method further includes: the first device establishes a matching relationship between an application contact of the first device and an application contact of the second device; and/or the second device establishes a matching relationship between an application contact of the first device and an application contact of the second device.

Specifically, when the two devices have a same ID or associated IDs, that the first device is used as a display end and the second device is used as a computing end may be implemented in a data virtualization manner. In a case in which a contact that is in communication with the second device is obtained on the first device end, when clicking a profile picture of the contact on the first device end, a user may invoke matched available communication software (Huawei Messaging/Huawei social software or matched third-party social software) of the contact on the second device. In this manner, each device does not need to perform contact matching independently, so that a calculation amount of the device is reduced.

The first device may establish the matching relationship between the first application contact and the second application contact in the following two manners.

In a first manner, when a user authorizes the first device, the first device automatically matches the first application contact with the second application contact. In this implementation, the first application contact and the second application contact may be registered with a real name, and the first device may quickly match the first application contact with the second application contact by using the name. Alternatively, the first application contact and the second application contact may not be registered with a real name. However, both the first application contact and the second application contact are verified by using identity information of the contacts. Therefore, the first device may match the first application contact with the second application contact by using the identity information corresponding to the first application contact and the identity information corresponding to the second application contact. For example, the first application is a telephone address book, and when a contact Ann is entered into the address book, Ann's identity information is bound at the same time. The second application is WeChat, and when a contact Sun (Sun is Ann's WeChat nickname) is entered into WeChat contacts, Ann's identity information is bound at the same time. The first device determines, by searching identity information of contacts in the address book and identity information of WeChat contacts, that Ann matches Sun in the WeChat application.

In a second manner, user intervention is needed. A user needs to manually bind, in the first application of the first device, an account of the second application contact that matches the first application contact. For example, the first application is a telephone address book, and a user manually adds each contact of the first application to an address book of a WeChat/DingTalk/Welink account or the like of the second application.

It should be understood that the first application may be an application of local contacts, for example, a call address book of a mobile phone, and the second application may be a third-party application, for example, WeChat/Dingtalk/Welink. A third-party application is an application created by a developer, and the developer is not a manufacturer of a device running the application or an owner of a website providing the application. For example, a Safari web browser application on an iPhone is a native application made by Apple. However, an App Store includes other web browser applications that are approved by the Apple for use on the iPhone but that are not developed. These applications are third-party applications. A third-party application refers to a software program that is not pre-installed in a system (including the operating system and pre-installed applications).

In an implementation, that the first device determines that the user identity of the first device is the same as the user identity of the second device includes: determining, based on any one or more of passwords and accounts on the first device and the second device that are logged in to by a user, facial recognition of a camera, fingerprint recognition, and voiceprint recognition, that the user identity of the first device is the same as the user identity of the second device.

Specifically, when the user uses the first device, the first device authenticates that the user identity of the first device is the same as the user identity of the second device by using the password of the account of the first device that is logged in to by the user, facial recognition of a camera of the first device, fingerprint recognition, voiceprint recognition, or the like. In this case, an authorization condition for data exchange is met.

In addition to a cross-device interaction problem, a user further faces a single-device cross-application interaction problem. For example, a plurality of APPs are loaded on a current terminal device, and a user A makes a call to a contact B by using a mobile phone. In this case, the user A needs to send a picture to the contact B on the mobile phone. In a current technology, the user A needs to search for the contact B in a third-party application, and this is inconvenient. Sometimes, the user A may not find the contact B due to negligence. In view of this, this application further provides a single-device cross-application interaction method. In the method, the user A does not need to search for the contact B in third-party software. Instead, the mobile phone directly recommends the contact B in a third-party APP, so that convenience of single-device cross-application interaction is improved.

It should be understood that the associated device status-based cross-device interaction method in this embodiment of this application may alternatively be implemented by using a distributed cloud structure. The following describes implementation of the associated device status-based cross-device interaction method by using the distributed cloud structure.

A cloud server is configured to store data of a plurality of associated devices, and the cloud server may be one server. Data such as tasks executed by a first device and a second device is synchronized to the cloud server. The cloud server may send related information of a task being executed by the second device to the first device. The first device updates, based on a target user of the task being executed by the second device, a target contact of an application currently used by the first device to the target user. The related information of the task being executed by the second device includes the target user of the task being executed by the second device. The first device sends information to the target user.

For example, a mobile phone and a computer are associated devices, and data such as tasks executed by the mobile phone and the computer is synchronized to a cloud server. When the mobile phone and the computer log in to a same account, a task being executed by another device of the same account and task details are synchronously obtained by using the cloud server.

In an implementation, before the cloud server may send related information of the task being executed by the second device to the first device, the method further includes: the first device determines that a user identity of the first device is the same as a user identity of the second device.

In an implementation, that the first device updates, based on the target user of the task being executed by the second device, an alternate target contact of the application currently used by the first device to the target user includes: determining, based on a matching relationship between a contact of the application currently used by the first device and a contact of an application to which the task being executed by the second device belongs, a target user that is of the application currently used by the first device and that corresponds to the target user of the task being executed by the second device.

In an implementation, the method further includes: the first device establishes a matching relationship between an application contact of the first device and an application contact of the second device; and/or the second device establishes a matching relationship between an application contact of the first device and an application contact of the second device.

In an implementation, the method further includes: the first device establishes a matching relationship between an application contact of the first device and an application contact of the second device; the first device synchronizes the matching relationship to a cloud server; and the cloud stores the matching relationship, so that another device associated with the first device invokes the matching relationship.

In an implementation, that the first device determines that the user identity of the first device is the same as the user identity of the second device includes: determining, based on any one or more of passwords and accounts on the first device and the second device that are logged in to by a user, facial recognition of a camera, fingerprint recognition, and voiceprint recognition, that the user identity of the first device is the same as the user identity of the second device.

In an implementation, the first device switches to execute the task being executed by the second device. The first device sends switchover information to the cloud server, where the switchover information is used to notify the cloud server that the first device is to execute the task being executed. After receiving the switchover information, the cloud server sends the switchover information to the second device. After receiving the switchover information, the second device no longer executes the task being executed.

For example, Ann makes a call to Laura on the mobile phone. Ann's mobile phone and computer use a same account ID for login. The computer may learn that Ann's mobile phone is executing "a task of being in a call with Laura". If Ann clicks "Switch to computer" on the computer, the computer synchronizes the instruction to the mobile phone end through the cloud server, and the mobile phone end executes the instruction. At the same time, the computer end invokes address book information of the mobile phone, and switches audio input and output of the call/picture input and output of the call from the mobile phone to the computer end.

In an implementation, the first device ends the task being executed. The first device sends task end information to the cloud server, and the cloud server sends the task end information to the second device. After receiving the task end information, the second device ends the task being executed.

For example, Ann makes a call to Laura on the mobile phone. Ann's mobile phone and computer use a same account ID for login. The computer may learn that Ann's mobile phone is executing "a task of being in a call with Laura". If Ann clicks "Hang up" on the computer, the computer synchronizes the instruction of hanging up the call to the cloud server, and then the cloud server synchronizes the instruction to the mobile phone end, so that the mobile phone end executes the instruction of hanging up the call.

It should be understood that all embodiments of cross-device interaction provided in this application may be implemented in a cloud data synchronization manner.

Figure 5:
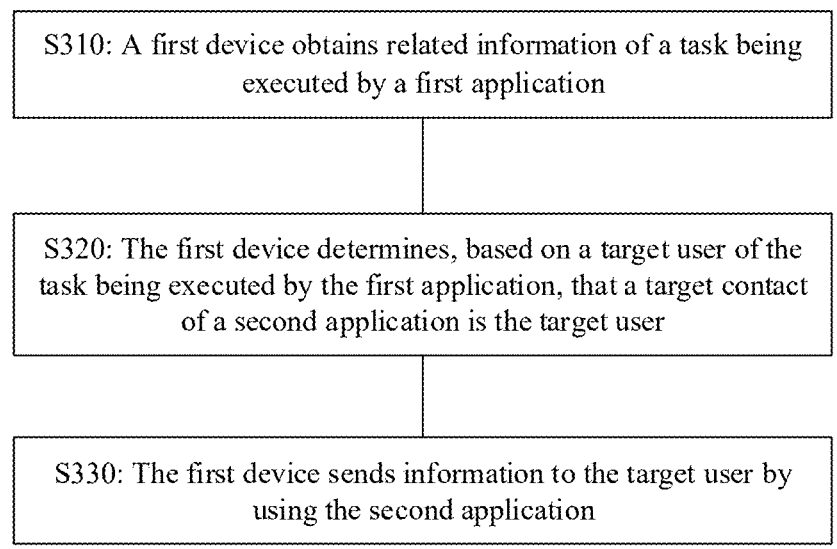
FIG. 5 is a schematic flowchart of a single-device cross-application interaction method according to this application.

The following describes in detail, with reference to FIG. 5, a single-device cross-application interaction method provided in this application. FIG. 5 is a schematic flowchart of a single-device cross-application interaction method 300 according to an embodiment of this application. The method 300 may be applied to the scenario shown in FIG. 1. Certainly, the method may also be applied to another communication scenario. This is not limited in this embodiment of this application.

It should be further understood that in this embodiment of this application, the method is described by using an example in which the method is performed by a terminal device. By way of example, rather than limitation, the method may alternatively be performed by a chip, a chip system, a processor, or the like used in the terminal device.

As shown in FIG. 5, the method 300 shown in FIG. 5 may include S310 to S330. The following describes in detail each step in the method 300 with reference to FIG. 5.

S310: A first device obtains related information of a task being executed by a first application, where the related information of the task being executed by the first application includes a target user of the task being executed and an identity document ID of a target device of the target user, and the first application is installed on the first device.

It should be understood that the identity document (Identity document, ID) of the target device may alternatively be referred to as a serial number or an account, is unique code in a system, and is equivalent to an "identity card". Generally, this rule is subjective in design based on a specific application environment, for example, "an employee ID", "an identity card number", and "a computer website". An identity document is very common in life. For example, an ID of a mobile phone generally refers to a serial number of the mobile phone. Each mobile phone is assigned a globally unique group of numbers after being assembled.

S320: The first device updates, based on the target user of the task being executed by the first application, an alternate target contact of a second application to the target user, where the second application is installed on the second device.

S330: The first device sends information to the target user by using the second application.

In an implementation, that the first device determines, based on the target user of the task being executed by the first application, that a target contact of the second application is the target user includes: the first device determines, based on a matching relationship between a contact of the first application and a contact of the second application, that the target contact of the second application is the target user.

Figure 6:
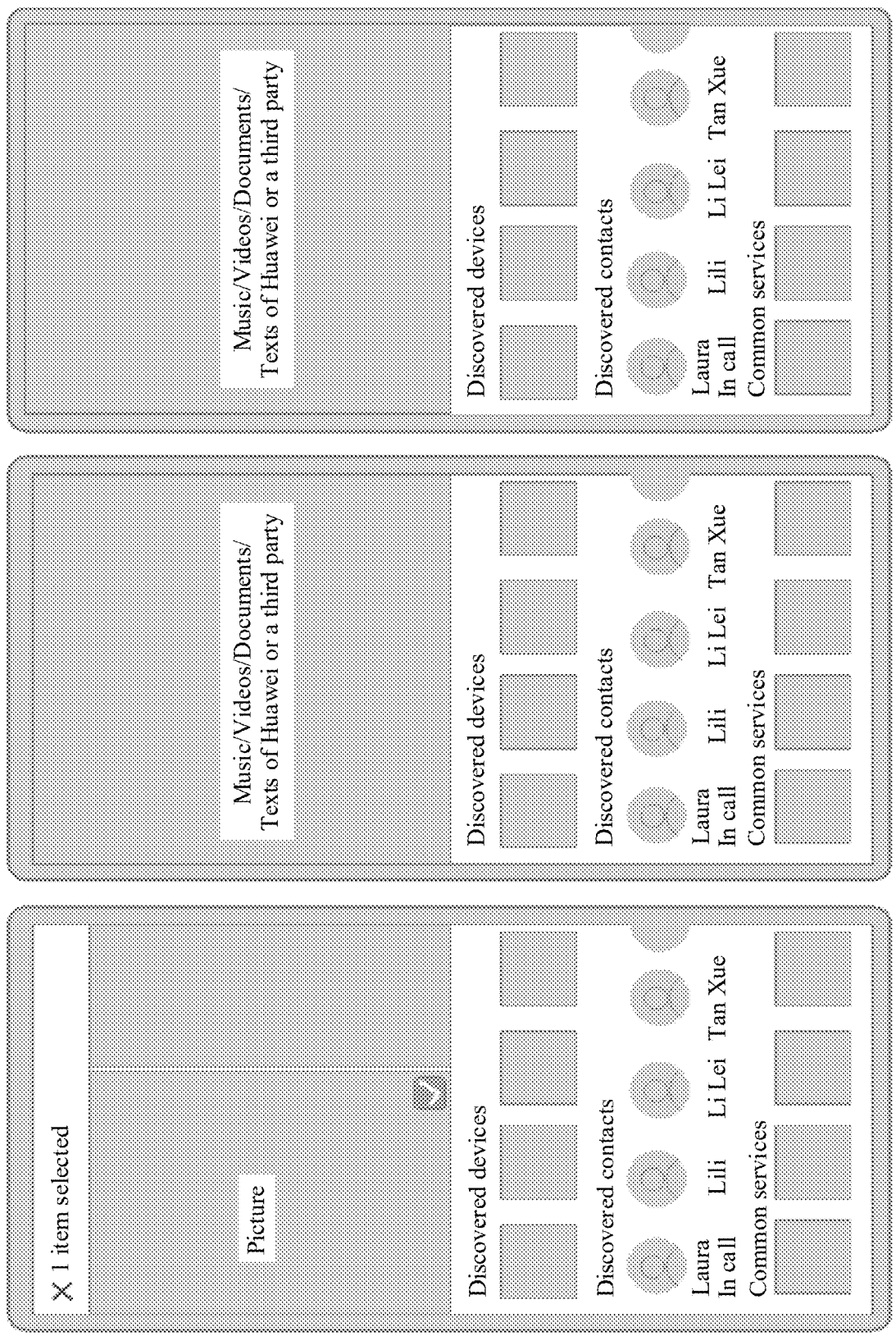
FIG. 6 is a diagram of a scenario of single device-based cross-application interaction.

For example, as shown in FIG. 6, a user Ann uses a mobile phone to call Laura. The mobile phone used by Ann may obtain a behavior that Ann is in a call with Laura and a mobile phone ID of Laura. Ann's mobile phone automatically sets alternate target contacts of a plurality of applications on the mobile phone to Laura, and a contact matching relationship is established between the plurality of applications and an address book on the mobile phone. The first application is a "Call" application, and the second application is a plurality of applications other than the "Call" application on the mobile phone, for example, a "Share pictures" application and a "Send emails" application. When Ann shares pictures, audio, videos, and maps, the contact Laura is preferably recommended. In addition to sharing pictures, audio, videos, and maps shown in FIG. 6, Laura is preferably displayed in a contact list on a "New Message" page of the mobile phone used by Ann. When Ann uses "New Email" on the mobile phone, an email is recommended to be sent to Laura.

In an implementation, the method 300 further includes: the first device establishes the matching relationship between the first application contact and the second application contact.

Specifically, different applications may correspond to different names of contacts. If matching relationships between contacts of a plurality of applications is not pre-established, the first device may fail to search the plurality of applications for a current contact. Consequently, the method cannot be implemented. For a process in which the first device establishes the matching relationship between a contact of the first application and a contact of the second application, refer to the descriptions in the method 200. To avoid repetition, details are not described herein again.

This application further provides a function of quickly continuing a dialog across devices based on a contact who is in an instant messaging (Instant Messaging, IM) dialog. First, instant messaging is briefly introduced. Instant messaging may be classified into personal instant messaging and business instant messaging. Personal instant messaging is mainly used by individual (natural) users. Personal instant messaging provides open member information for non-profit purposes and facilitates chatting, friend making, and entertainment, for example, QQ, WeChat, and mobile Fetion. In business instant messaging, business generally refers to a buyer-supplier relationship. Examples of business instant messaging are Alitalk, Tradelink, Alitalk Taobao version, and the like that are of enterprise platform networks.

When Ann sends a WeChat message to Laura by using a mobile phone, Ann does not exit a WeChat dialog on the mobile phone, and starts to use another device associated with the mobile phone. For example, when Ann uses a tablet computer or a foldable screen device, the tablet computer or the foldable screen device may send request information to the mobile phone. The request information is used by the mobile phone to send, to the tablet computer or the foldable screen device, the WeChat dialog being executed on the mobile phone. The IM dialog may continue to be executed on the tablet computer or the foldable screen device. The mobile phone is the second device, and the tablet computer or the foldable screen device is the first device.

Figure 7A:
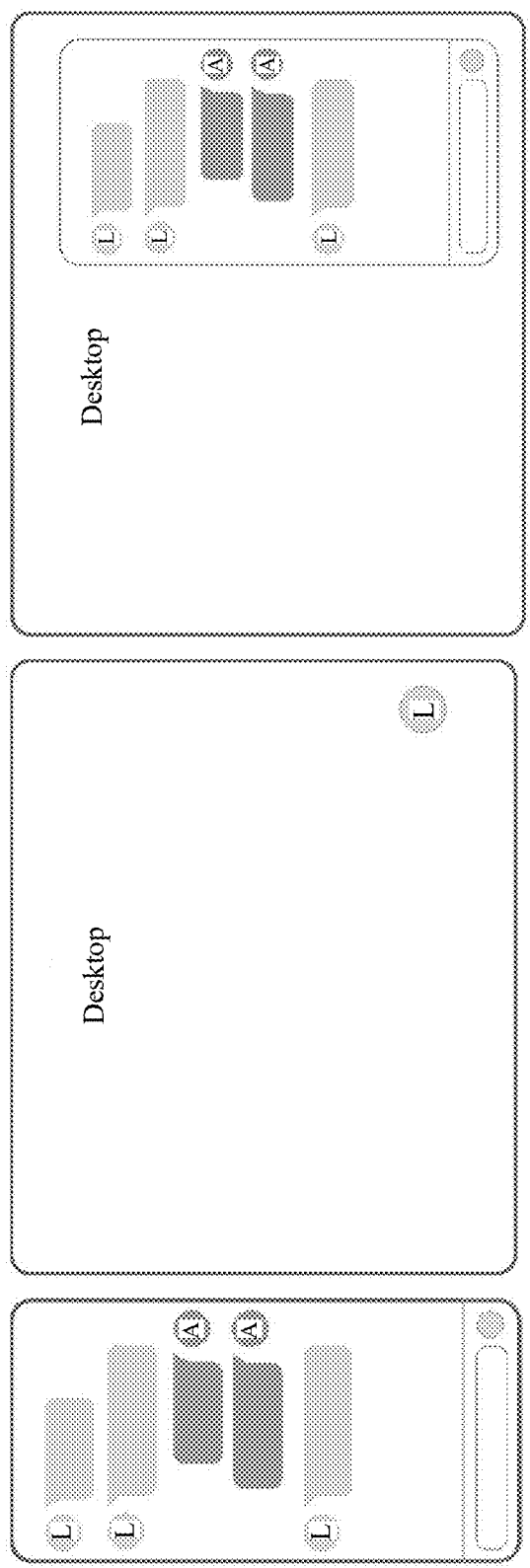
FIG. 7a is a schematic block diagram of quickly continuing a dialog on a tablet based on a contact in a WeChat dialog.

FIG. 7a is a schematic block diagram of quickly continuing a dialog on a tablet based on a contact in a WeChat dialog. Ann chats with Laura through WeChat on a mobile phone. When Ann collapses the mobile phone (a WeChat dialog window with Laura is not closed on the mobile phone) and uses a tablet/foldable screen device, the tablet device obtains, from Ann's mobile phone, the WeChat dialog being executed on the mobile phone. The tablet displays a floating dock for chatting with Laura through WeChat. The floating dock is tapped, to open a floating window/card for chatting with Laura on the tablet.

Figure 7B:
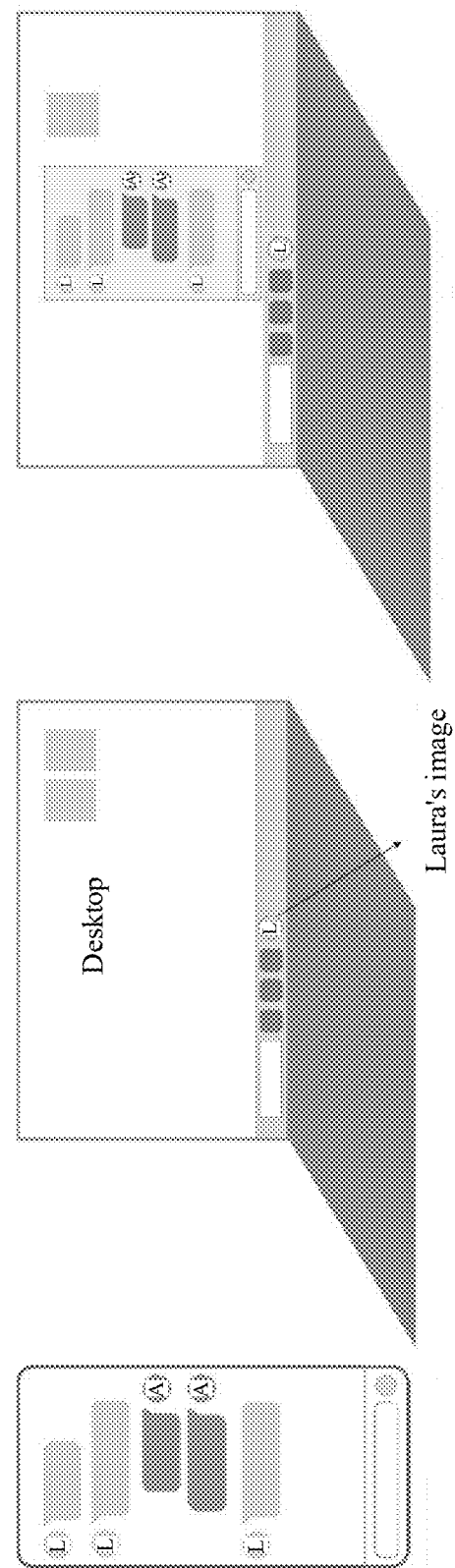
FIG. 7b is a schematic block diagram of quickly continuing a dialog on a computer based on a contact in a WeChat dialog.

FIG. 7b is a schematic block diagram of quickly continuing a dialog on a computer based on a contact in a WeChat dialog. Ann chats with Laura through WeChat on the mobile phone. When Ann collapses the mobile phone (a dialog window is not closed) and uses the computer, Ann's computer obtains, from Ann's mobile phone, the WeChat dialog being executed on the mobile phone. An image of Laura is displayed in a task bar area of the computer. The image of Laura is clicked, to open a floating window or card for chatting with Laura through WeChat on the computer, and continue the chatting.

This application further provides a method for quickly cross-device controlling, based on audio/video being played, the audio/video. A user uses a first device to play music, and at the same time, the user uses a second device within a specific distance (for example, within a range required by a same Wi-Fi). The first device is associated with the second device. The second device may send request information to the first device, and the request information is used by the first device to send, to the second device, data for playing music that is being executed on the first device. The user may directly control the music on the second device.

Figure 8A:
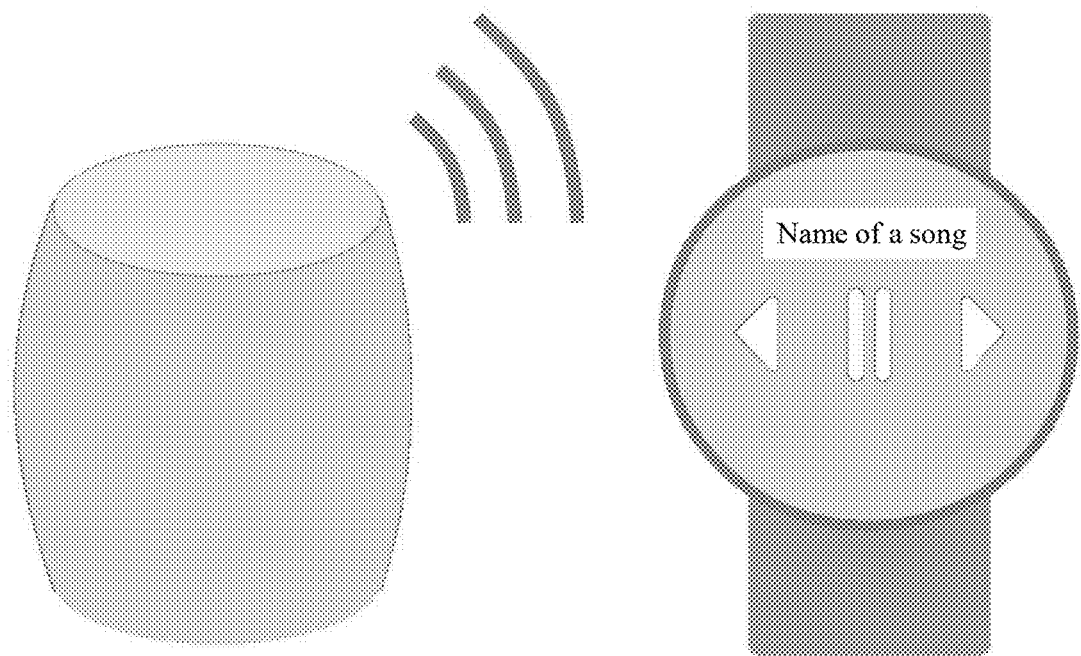
FIG. 8a is a schematic block diagram of controlling acoustic music on a smart watch.

FIG. 8a is a schematic block diagram of controlling acoustic music on a smart watch. Ann plays music on a sound box. The sound box is a first device. Within a specific distance, Ann wears a smart watch, and the smart watch is a second device. Ann starts to use the smart watch to, for example, watch time. In this case, the smart watch may send request information to the sound box, to request the sound box to send, to the smart watch, data for playing music that is being executed on the sound box. Ann swipes up on a home page of the smart watch, and the smart watch displays a control interface of the music being played. Ann may directly perform music control on the smart watch.

Figure 8B:
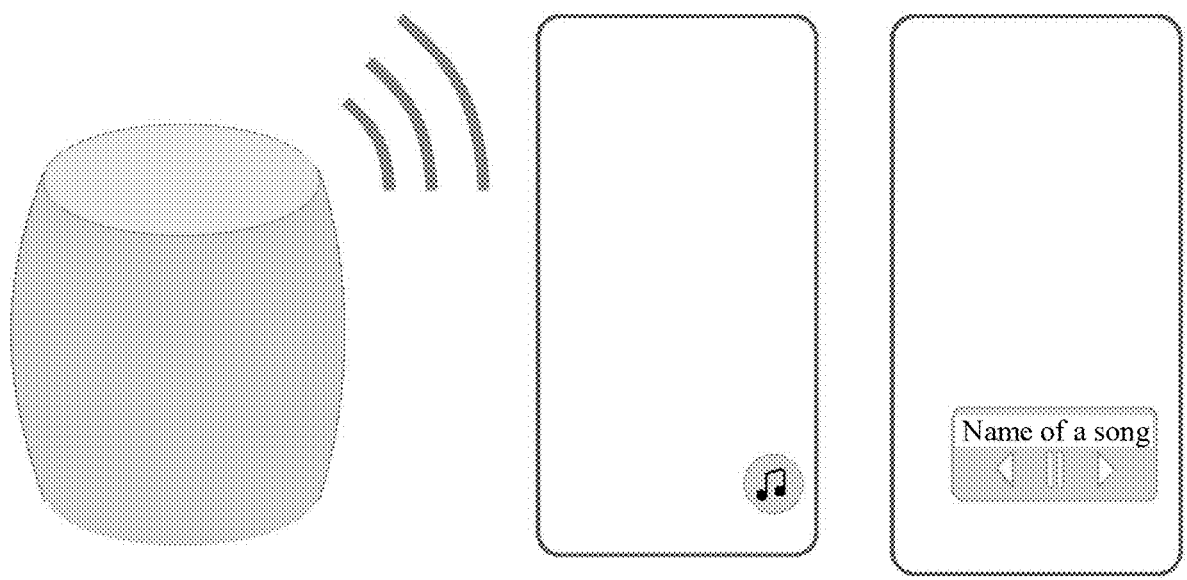
FIG. 8b is a schematic block diagram of controlling acoustic music on a mobile phone.

FIG. 8b is a schematic block diagram of controlling acoustic music on a mobile phone. When Ann plays music on the sound box, the sound box is a first device. Within a specific distance, when Ann starts to use the mobile phone, the mobile phone is a second device. The mobile phone may send request information to the sound box, to request the sound box to send, to the mobile phone, data for playing music that is being executed on the sound box. A floating dock may be used to display the music being played on the mobile phone. The music floating dock is tapped, to expand a music control card and perform music control. The user may alternatively set a hidden floating dock, and invoke the music floating dock by using a specific gesture, to perform music control.

Figure 8C:
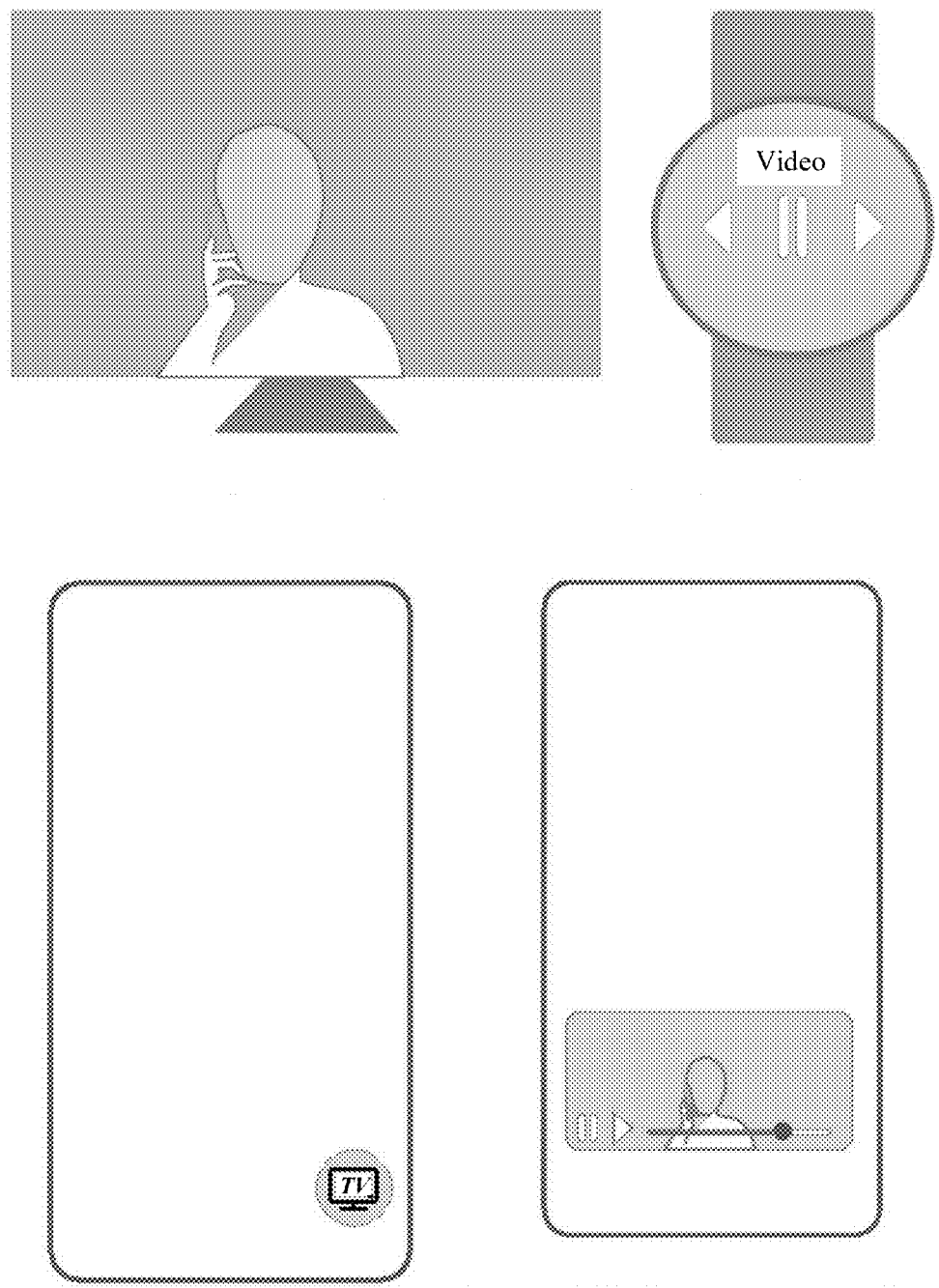
FIG. 8c is a schematic block diagram of controlling a television video by using a floating dock on a smart watch or on a mobile phone.

FIG. 8c is a schematic block diagram of controlling a television video by using a floating dock on a smart watch or on a mobile phone. When Ann plays a video on a television, within a specific distance, Ann may alternatively quickly control video playing by using a floating dock on the smart watch worn by Ann or on the mobile phone. The television is a first device, and the smart watch or the mobile phone is a second device. A method thereof is the same as the method for quickly controlling audio playing on the smart watch or the mobile phone. For the method, refer to the foregoing descriptions. Details are not described herein again.

This application further provides a method for quickly continuing processing, based on a document or a picture that is being processed, the document or the picture across devices. A user uses a first device to process a document or a picture, and at the same time, the user uses a second device within a specific distance (for example, within a range required by a same Wi-Fi). The first device is associated with the second device. The second device may send request information to the first device, and the request information is used by the first device to send, to the second device, data of the document or the picture that is being executed on the first device. The user may continue processing the document or the picture on the second device.

To understand the method more clearly, the following uses a specific example for description. In the following, a mobile phone is a first device, and a tablet and a computer are second devices.

Figure 9A:
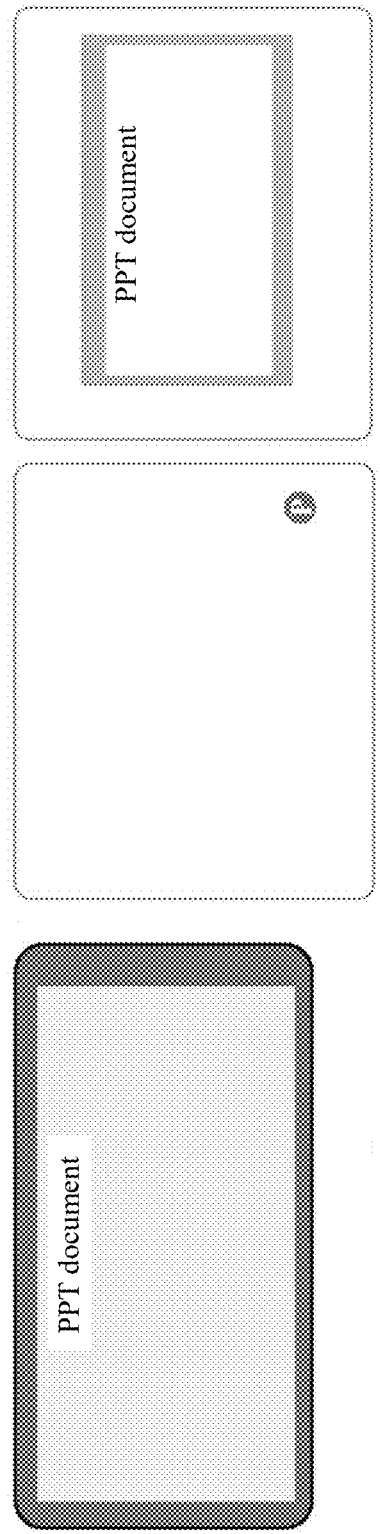
FIG. 9a is a schematic block diagram of continuing, on a tablet, processing of a document on a mobile phone.

FIG. 9a is a schematic block diagram of continuing, on a tablet, processing of a document on a mobile phone. When Ann edits or reads a document on the mobile phone, and Ann collapses the mobile phone (the document on the mobile phone is not closed) and turns on the tablet, the tablet sends request information to the mobile phone, to request the mobile phone to send, to the tablet, data of the document being edited or read on the mobile phone. The tablet displays a floating dock of the document. Ann taps the floating dock, to open the document being edited or read on the tablet.

Figure 9B:
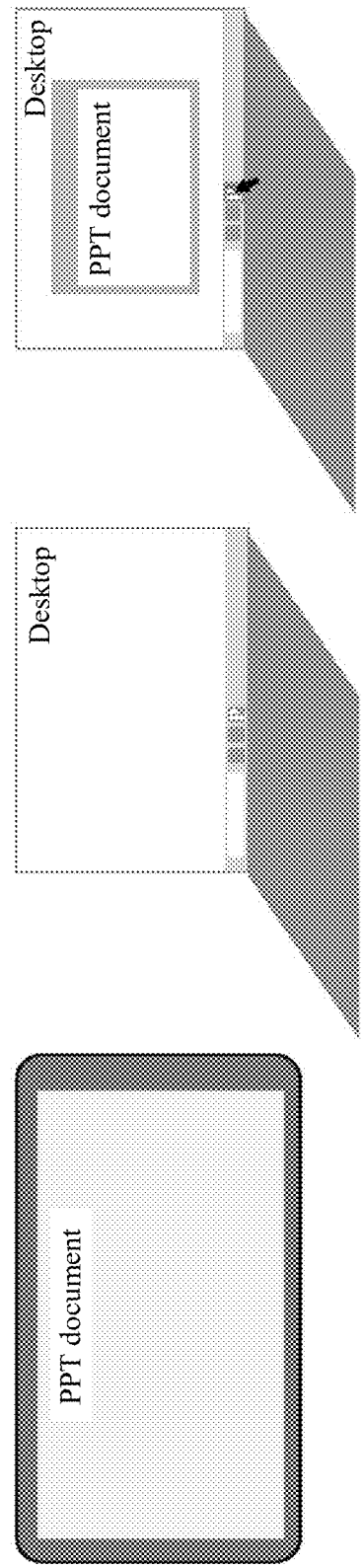
FIG. 9b is a schematic block diagram of continuing, on a computer, processing of a document on a mobile phone.

FIG. 9b is a schematic block diagram of continuing, on a computer, processing of a document on a mobile phone.

When Ann edits or reads a document on the mobile phone, and Ann collapses the mobile phone (the document on the mobile phone is not closed) and turns on the computer, the computer sends request information to the mobile phone, to request the mobile phone to send, to the computer, data of the document being edited or read on the mobile phone. An icon of the document is displayed in a task bar area of the computer. Ann clicks the icon of the document, to open the document being edited or read on the computer.

Similarly, when Ann edits or browses a picture on the mobile phone, and Ann collapses the mobile phone (the picture on the mobile phone is not closed) and turns on the tablet, the tablet sends request information to the mobile phone, to request the mobile phone to send, to the tablet, data of the picture being edited or browsed on the mobile phone. The tablet displays a floating dock of a gallery. Ann taps the floating dock, to open the picture being edited or browsed on the tablet.

When Ann edits or browses a picture on the mobile phone, and Ann collapses the mobile phone (the picture on the mobile phone is not closed) and turns on the computer, the computer sends request information to the mobile phone, to request the mobile phone to send, to the computer, data of the picture being edited or browsed on the mobile phone. An icon of the gallery is displayed in a task bar area of the computer. Ann clicks the icon of the gallery, to open the picture being edited or browsed on the computer.

A plurality of terminal devices in the foregoing embodiments of this application may be private devices of a user, for example, mobile phones of the user, tablets of the user, or computers of the user. The plurality of terminal devices are associated based on a user identity. Alternatively, the terminal device may be a public terminal device. The public terminal device may be a household public terminal device, for example, a computer. On the computer, each family member may log in, and the public terminal device records an association relationship between a logged-in account of a user and another device of the user.

The foregoing describes in detail, with reference to FIG. 1 to FIG. 9, the cross-device interaction method provided in embodiments of this application. The following describes in detail, with reference to FIG. 10 to FIG. 11, a communication apparatus provided in embodiments of this application.

Figure 10:
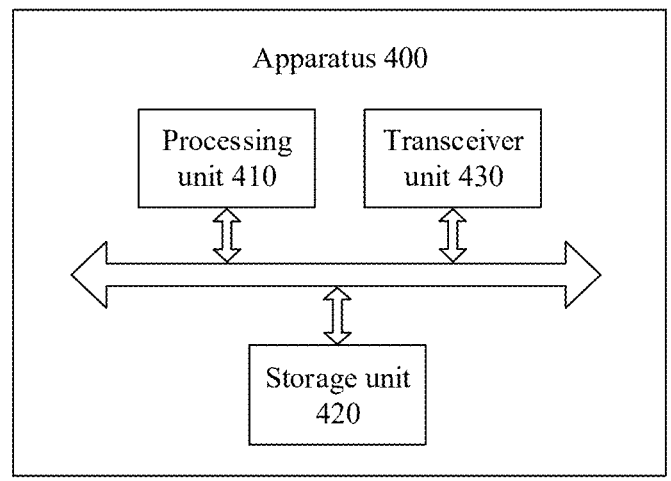
FIG. 10 is a schematic block diagram of an apparatus according to an embodiment of this application.

FIG. 10 is a schematic block diagram of a communication apparatus 400 according to an embodiment of this application.

In some embodiments, the apparatus 400 may be a first device, or may be a chip or a circuit, for example, a chip or a circuit that may be disposed in a first device.

In some embodiments, the apparatus 400 may be a second device, or may be a chip or a circuit, for example, a chip or a circuit that may be disposed in a second device.

In a possible manner, the apparatus 400 may include a processing unit 410 (that is, an example of a processor) and a transceiver unit 430. In some possible implementations, the processing unit 410 may further be referred to as a determining unit. In some possible implementations, the transceiver unit 430 may include a receiving unit and a transmitting unit.

Optionally, the transceiver unit 430 may be implemented by using a transceiver, a transceiver-related circuit, or an interface circuit.

Optionally, the apparatus may further include a storage unit 420. In a possible manner, the storage unit 420 is configured to store instructions. Optionally, the storage unit may alternatively be configured to store data or information. The storage unit 420 may be implemented by using a memory.

In some possible designs, the processing unit 410 is configured to execute the instructions stored in the storage unit 420, so that the apparatus 400 is enabled to implement the steps performed by the first device in the foregoing method. Alternatively, the processing unit 410 may be configured to invoke data in the storage unit 420, so that the apparatus 400 is enabled to implement the steps performed by the first device in the foregoing method.

In some possible designs, the processing unit 410 is configured to execute the instructions stored in the storage unit 420, so that the apparatus 400 is enabled to implement the steps performed by the second device in the foregoing method. Alternatively, the processing unit 410 may be configured to invoke data in the storage unit 420, so that the apparatus 400 is enabled to implement the steps performed by the second device in the foregoing method.

For example, the processing unit 410, the storage unit 420, and the transceiver unit 430 may communicate with each other by using an internal connection path, to transmit a control signal and/or a data signal. For example, the storage unit 420 is configured to store a computer program, and the processing unit 410 may be configured to invoke the computer program from the storage unit 420 and run the computer program, to control the transceiver unit 430 to receive a signal and/or transmit a signal, so that the steps performed by the terminal device or the access network device in the foregoing method are completed. The storage unit 420 may be integrated into the processing unit 410, or may be disposed separately from the processing unit 410.

Optionally, when the apparatus 400 is a communication device (for example, a terminal device), the transceiver unit 430 includes a receiver and a transmitter. The receiver and the transmitter may be a same physical entity or different physical entities. When the receiver and the transmitter are a same physical entity, the receiver and the transmitter may be collectively referred to as a transceiver.

Optionally, when the apparatus 400 is a chip or a circuit, the transceiver unit 430 includes an input interface and an output interface.

In an implementation, it may be considered that a function of the transceiver unit 430 is implemented by using a transceiver circuit or a dedicated transceiver chip. It may be considered that the processing unit 410 is implemented by using a dedicated processing chip, a processing circuit, a processing unit, or a general-purpose chip.

In another implementation, it may be considered that the communication device (for example, the terminal device) provided in this embodiment of this application is implemented by using a general-purpose computer. To be specific, program code for implementing functions of the processing unit 410 and the transceiver unit 430 is stored in the storage unit 420, and a general-purpose processing unit implements the functions of the processing unit 410 and the transceiver unit 430 by executing the code stored in the storage unit 420.

In some embodiments, the apparatus 400 may be a first device, or a chip or a circuit that is disposed in a first device.

When the apparatus 400 is the first device, or a chip or a circuit that is disposed in the first device, the processing unit 410 is configured to determine that a user identity of the first device is the same as a user identity of the second device. The transceiver unit 430 is configured to obtain related information of a task being executed by the second device, where the related information of the task being executed by the second device includes a target user of the task being executed by the second device. The processing unit 410 is further configured to: determine, based on the target user of the task being executed by the second device, that a target contact of an application currently used by the first device is the target user. The transceiver unit 430 is further configured to send information to the target user.

In an implementation, the transceiver unit 430 is specifically configured to: the first device sends first information to the second device, where the first information is used to indicate the second device to send the related information of the task being executed by the second device to the first device.

In an implementation, the transceiver unit 430 is specifically configured to: the first device sends second information to the second device, where the second information is used to notify the second device that the user identity of the first device is the same as the user identity of the second device.

In an implementation, the processing unit 410 is specifically configured to: determine, based on a matching relationship between a contact of the application currently used by the first device and a contact of an application to which the task being executed by the second device belongs, a target user that is of the application currently used by the first device and that corresponds to the target user of the task being executed by the second device.

In an implementation, the processing unit 410 is further configured to establish the matching relationship between the contact of the application currently used by the first device and the contact of the application to which the task being executed by the second device belongs.

In an implementation, the first device is associated with the second device by using a same identity document ID or an associated ID of a same identity.

In an implementation, the processing unit 410 is specifically configured to: determine, based on any one or more of passwords and accounts on the first device and the second device that are logged in to by a user, facial recognition of a camera, fingerprint recognition, and voiceprint recognition, that the user identity of the first device is the same as the user identity of the second device.

With reference to the fifth aspect, in some implementations of the fifth aspect, the application of the task being executed by the second device is the same as the application currently used by the first device.

In an implementation, the processing unit 410 obtains related information of a task being executed by a first application, where the related information of the task being executed by the first application includes a target user of a task being executed by the first device and a target device ID of the target user in contact with the first device. The processing unit 410 determines, based on the target user of the task being executed by the first application, that a target contact of the second application is the target user. The transceiver unit 430 sends information to the target user by using the second application.

In an implementation, the processing unit 410 determines, based on a matching relationship between a contact of the first application and a contact of the second application, that the target contact of the second application is the target user.

In an implementation, the processing unit 410 establishes the matching relationship between a contact of the first application and a contact of the second application.

When the apparatus 400 is configured on the first device or is the first device, modules or units in the apparatus 400 may be configured to perform actions or processing processes performed by the first device in the foregoing method. To avoid repetition, detailed descriptions thereof are omitted herein.

In some embodiments, the apparatus 400 may be a second device, or a chip or a circuit that is disposed in a second device.

When the apparatus 400 is a second device, or a chip or a circuit that is disposed in a second device, the transceiver unit 430 receives first information sent by a first device, where the first information is used to indicate the second device to send related information of a task being executed by the second device to the first device.

After the second device receives the first information, the transceiver unit 430 sends the related information of the task being executed by the second device to the first device.

In an implementation, the transceiver unit 430 receives second information sent by the first device, where the second information is used to notify the second device that a user identity of the first device is the same as a user identity of the second device. After the second device receives the second information, the transceiver unit 430 sends the related information of the task being executed by the second device to the first device.

In an implementation, the processing unit 410 establishes a matching relationship between an application contact of the first device and an application contact of the second device.

When the apparatus 400 is configured on the second device or is the second device, modules or units in the apparatus 400 may be configured to perform actions or processing processes performed by the second device in the foregoing method. To avoid repetition, detailed descriptions thereof are omitted herein.

It should be understood that the foregoing first device may be a second device, and the foregoing second device may be a first device.

Figure 11:
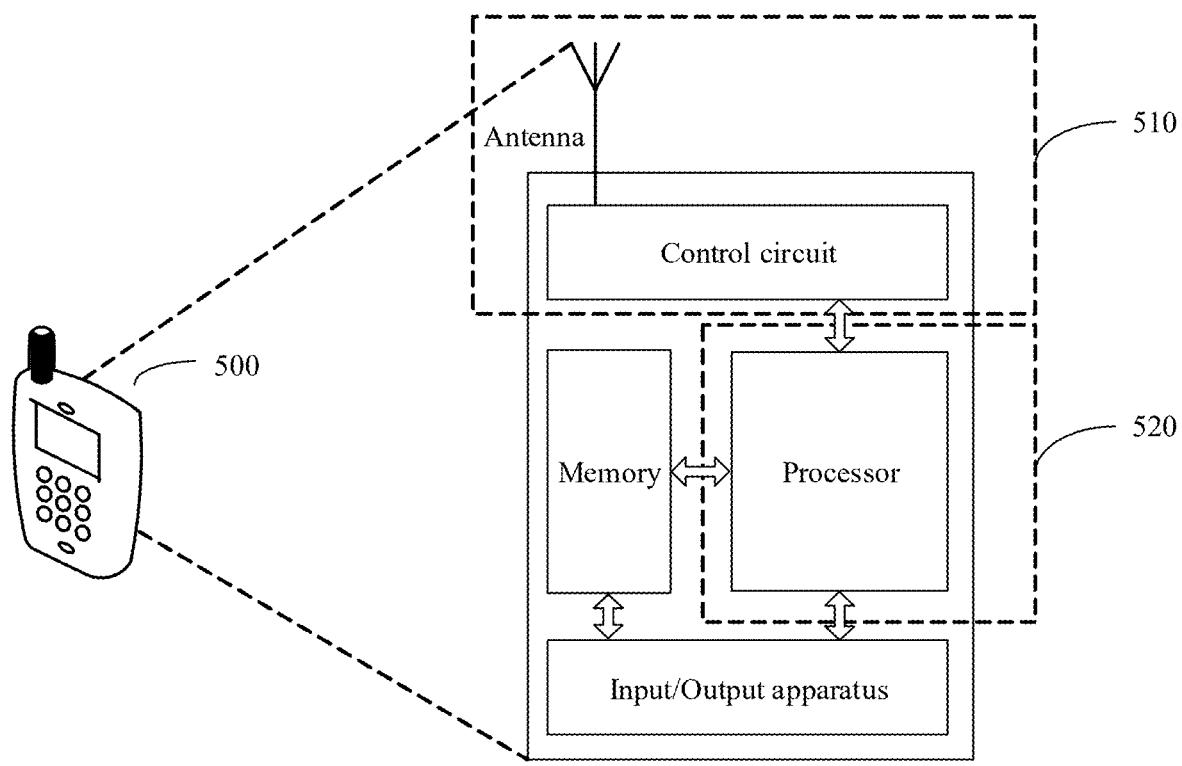
FIG. 11 is a schematic diagram of a structure of a terminal device according to this application.

FIG. 11 is a schematic diagram of a structure of a terminal device 500 according to this application. The terminal device 500 may perform the actions performed by the first device and the second device in the foregoing method embodiments.

For ease of description, FIG. 11 shows only main components of the terminal device. As shown in FIG. 11, the terminal device 500 includes a processor, a memory, a control circuit, an antenna, and an input/output apparatus.

The processor is mainly configured to: process a communication protocol and communication data, control the entire terminal device, execute a software program, and process data of the software program. For example, the processor is configured to support the terminal device in performing an action described in the foregoing embodiment of the method. The memory is mainly configured to store a software program and data described in the foregoing embodiment. The control circuit is mainly configured to convert a baseband signal and a radio frequency signal and process the radio frequency signal. The control circuit and the antenna together may alternatively be referred to as a transceiver, and are mainly configured to receive and transmit a radio frequency signal in a form of an electromagnetic wave. The input/output apparatus such as a touchscreen, a display, or a keyboard is mainly configured to receive data input by a user and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 11 shows only one memory and one processor. In an actual terminal device, there may be a plurality of processors and memories. The memory may alternatively be referred to as a storage medium, a storage device, or the like. This is not limited in embodiments of this application.

For example, the processor may include a baseband processor and a central processing unit. The baseband processor is mainly configured to process a communication protocol and communication data. The central processing unit is mainly configured to control the entire terminal device, execute a software program, and process data of the software program. The processor in FIG. 11 is integrated with functions of the baseband processor and the central processing unit. A person skilled in the art may understand that, the baseband processor and the central processing unit may be independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna and the control circuit that have a transceiver function may be used as a transceiver unit 510 of the terminal device 500, and the processor that has a processing function may be considered as a processing unit 520 of the terminal device 500. As shown in FIG. 11 the terminal device 500 includes the transceiver unit 510 an the processing unit 520. The transceiver unit may alternatively be referred to as a transceiver, a transceiver machine, a transceiver apparatus, or the like. Optionally, a component that is in the transceiver unit 510 and that is configured to implement a receiving function may be considered as a receiving unit, and a component that is in the transceiver unit 510 and that is configured to implement a sending function may be considered as a sending unit. In other words, the transceiver unit includes a receiving unit and a sending unit. For example, the receiving unit may alternatively be referred to as a receiver, a receive machine, or a receiving circuit, and the sending unit may be referred to as a transmitter, a transmit machine, or a transmit circuit.

It should be understood that, in this embodiment of this application, the processor may be a central processing unit (central processing unit, CPU), or the processor may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate, a transistor logic device, a discrete hardware component, or the like. The general-purpose processor may be a microprocessor, or the processor may be any conventional processor, or the like.

It should be further understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through an example rather than a limitative description, random access memories (random access memory, RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions or computer programs. When the computer instructions or the computer programs are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state disk.

An embodiment of this application further provides a computer-readable medium. The computer-readable medium stores a computer program. When the computer program is executed by a computer, the steps performed by the terminal device or the steps performed by the access network device in any one of the foregoing embodiments are implemented.

An embodiment of this application further provides a computer program product. When the computer program product is executed by a computer, the steps performed by the terminal device in any one of the foregoing embodiments are implemented.

An embodiment of this application further provides a system chip. The system chip includes a communication unit and a processing unit. The processing unit may be, for example, a processor. The communication unit may be, for example, a communication interface, an input/output interface, a pin, or a circuit. The processing unit may execute computer instructions, so that the chip in the communication apparatus performs the steps performed by the terminal device provided in the foregoing embodiments of this application.

Optionally, the computer instructions are stored in a storage unit.

According to the method provided in embodiments of this application, an embodiment of this application further provides a communication system, including the foregoing first device and the foregoing second device.

The embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to a radio channel, and various other media that can store, include and/or carry instructions and/or data.

It should be understood that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "At least one" means one or more. "At least one of A and B", similar to "A and/or B", describes an association relationship between associated objects and represents that three relationships may exist. For example, at least one of A and B may represent the following three cases: Only A exists, both A and B exist, and only B exists.

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus and method may be implemented in another manner. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in embodiments of this application may be integrated into one processing unit, or each of the units may exist alone physically, or two or more units are integrated into one unit.

When the function is implemented in a form of a software functional unit and sold or used as an independent product, the function may be stored in a computer-readable storage medium. Based on such an understanding, the technical solutions of this application essentially, or the part that contributes to a current technology, or the part of the technical solutions may be embodied in a form of a software product. The computer software product is stored in a storage medium, and includes several instructions for instructing a computer device (which may be a personal computer, a server, or an access network device) to perform all or some of the steps of the method described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cross-device interaction method, comprising:
determining, by a first device, that a user identity of the first device is the same as a user identity of a second device, wherein the second device is executing a first communication task of a first application with a target user;

obtaining, by the first device, the target user from the second device via a network between the first device and the second device or via a cloud server;

starting and displaying, by the first device, a second application on the first device;

determining, by the first device based on the target user, a target contact of the first application corresponding to the target user, wherein the first application comprises a matching relationship between the target user and the target contact;

recommending, by the first device, the target contact when the first device starting a second communication task of the second application by displaying information for indicating the target contact;

receiving, by the first device, an operation on the information for indicating the target contact; and sending, by the first device, information to the target contact by the second communication task of the second application.

2. The method according to claim 1, wherein the obtaining, by the first device, the target user from the second device via a network between the first device and the second device or via a cloud server comprises:

sending, by the first device, first information to the second device, wherein the first information is used to indicate the second device to send related information of the first communication task being executed by the second device to the first device, and wherein the related information of the first communication task being executed by the second device comprises the target user.

3. The method according to claim 1, wherein obtaining, by the first device, the target user from the second device via a network between the first device and the second device or via a cloud server comprises:

sending, by the first device, second information to the second device, wherein the second information is used to notify the second device that the user identity of the first device is the same as the user identity of the second device.

4. The method according to claim 1, wherein the method further comprises:

establishing, by the first device, the matching relationship between a contact of the second application and a contact of the first application.

5. The method according to claim 1, wherein the first device is associated with the second device by using a same identity document (ID) or an associated ID of a same identity.

6. The method according to claim 1, wherein the determining, by a first device, that a user identity of the first device is the same as a user identity of a second device comprises:

determining, based on any one or more of passwords and accounts on the first device and the second device that are logged in to by a user, facial recognition of a camera, fingerprint recognition, and voiceprint recognition, that the user identity of the first device is the same as the user identity of the second device.

7. The method according to claim 1, wherein the first application running on the second device is the same as the second application running on the first device.

8. A device, wherein the device is a first device and comprises:

at least one processor;

one or more memories coupled to the at least one processor and storing programming instructions for execution by the at least one processor to determine that a user identity of the first device is the same as a user identity of a second device, wherein the second device is executing a first communication task of a first application with a target user; and a transceiver, the transceiver configured to obtain the target user from the second device via a network between the first device and the second device or via a cloud server, wherein:

the programming instructions are for execution by the at least one processor to:

start and display a second application on the first device;

determine, based on the target user, a target contact of the first application corresponding to the target user, wherein the first application comprises a matching relationship between the target user and the target contact; and recommend the target contact when the first device starting a second communication task of the second application by displaying information for indicating the target contact; and the transceiver is further configured to:

receive an operation on the information for indicating the target contact; and send information to the target contact by the second communication task of the second application.

9. The device according to claim 8, wherein the transceiver is configured to:

send, by the first device, first information to the second device, wherein the first information indicate the second device to send related information of the first communication task being executed by the second device to the first device, and wherein the related information of the first communication task being executed by the second device comprises the target user.

10. The device according to claim 8, wherein the transceiver is configured to:

send, by the first device, second information to the second device, wherein the second information is used to notify the second device that the user identity of the first device is the same as the user identity of the second device.

11. The device according to claim 8, wherein the programming instructions are for execution by the at least one processor to establish the matching relationship between a contact of the second application and a contact of the first application.

12. The device according to claim 8, wherein the programming instructions are for execution by the at least one processor to:

determine, based on any one or more of passwords and accounts on the first device and the second device that are logged in to by a user, facial recognition of a camera, fingerprint recognition, and voiceprint recognition, that the user identity of the first device is the same as the user identity of the second device.

* * * * *